(12) United States Patent
Kaipu Narahari et al.

(10) Patent No.: US 11,216,051 B2
(45) Date of Patent: Jan. 4, 2022

(54) SMART SOCKET POWER MONITORING AND COORDINATION

(71) Applicant: QUALCOMM Incorporated, San Diego, CA (US)

(72) Inventors: Skanda Kumar Kaipu Narahari, Banashankari 3rd Stage (IN); Chirag Manojkumar Kharvar, Bangalore (IN); Dishant Srivastava, Bangalore (IN); Sourabh Jana, Bangalore (IN); Jagdeep Kumar Hans, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 39 days.

(21) Appl. No.: 16/521,155

(22) Filed: Jul. 24, 2019

(65) Prior Publication Data
US 2020/0341529 A1    Oct. 29, 2020

(30) Foreign Application Priority Data

Apr. 24, 2019    (IN) .............................. 201941016265

(51) Int. Cl.
*G06F 1/30*    (2006.01)
*G06F 11/30*    (2006.01)
(Continued)

(52) U.S. Cl.
CPC ............. *G06F 1/305* (2013.01); *G05B 15/02* (2013.01); *G06F 11/3058* (2013.01); *H04W 4/80* (2018.02); *H04W 84/18* (2013.01)

(58) Field of Classification Search
CPC .. G06F 1/305; G06F 11/3058; G06F 11/2015; G06F 2201/81; G06F 1/266;
(Continued)

(56) References Cited

U.S. PATENT DOCUMENTS 9,575,472 B1 *    2/2017 Clayton .............. H04L 12/2827
2008/0106146 A1 *    5/2008 Baek ...................... G01D 4/004
307/35
(Continued)

FOREIGN PATENT DOCUMENTS

CN          108832416 A     11/2018
WO    WO-2014127473 A1    8/2014

OTHER PUBLICATIONS

International Search Report and Written Opinion—PCT/US2020/025984—ISAEPO—dated May 25, 2020.

*Primary Examiner* — Kenneth M Lo
*Assistant Examiner* — Mohammed Shafayet
(74) *Attorney, Agent, or Firm* — Qualcomm Incorporated

(57) ABSTRACT

This disclosure provides systems, methods and apparatus for smart sockets in a communication network. A smart socket can be implemented to monitor one or more power quality characteristics of a power supply providing energy to the smart home environment. Smart sockets implemented to monitor power quality characteristics can sense when power fluctuations are present in the power supply, and shut down connected devices to prevent damage. A plurality of coordinating smart sockets can be implemented to optimize power utilization when the smart home environment is operating on backup power, during low electricity tariff periods, or when operating on a renewable energy source. The plurality of coordinating smart sockets can be implemented to autonomously schedule tasks based on a context of operation of other devices in the smart home environment. The plurality of coordinating smart sockets can be implemented to achieve configurable energy targets for the smart home environment.

30 Claims, 12 Drawing Sheets

(51) Int. Cl.
  *G05B 15/02* (2006.01)
  *H04W 84/18* (2009.01)
  *H04W 4/80* (2018.01)
(58) Field of Classification Search
  CPC ........ G05B 15/02; H04W 4/80; H04W 84/18;
        H04W 4/12; H04W 4/38; H04W 4/70;
        Y02D 30/70; Y02B 90/20; Y04S 10/30;
        Y04S 20/00; Y02E 60/00; H02J
        13/00032; H02J 13/00002
  USPC ........................................................ 700/295
  See application file for complete search history.

(56)  References Cited

U.S. PATENT DOCUMENTS

2010/0301774 A1* 12/2010 Chemel ................ H05B 47/155
                                    315/297
2012/0150359 A1   6/2012 Westergaard
2012/0316808 A1* 12/2012 Frader-Thompson ......................
                                    G01D 4/002
                                    702/61
2016/0088424 A1*  3/2016 Polo ........................ H04W 4/80
                                    455/41.1

* cited by examiner

SMART SOCKET POWER MONITORING AND COORDINATION

CROSS-REFERENCE TO RELATED APPLICATIONS

This Patent Application claims priority to Indian Provisional Patent Application No. 201941016265 filed Apr. 24, 2019 entitled "Smart Socket Power Monitoring and Coordination," and assigned to the assignee hereof. The disclosure of the prior Application is considered part of and is incorporated by reference in this Patent Application.

TECHNICAL FIELD

This disclosure generally relates to the field of wireless communication, and more particularly to smart sockets in a communication network.

DESCRIPTION OF THE RELATED TECHNOLOGY

Advances in electronic technology have reduced the cost of increasingly complex and useful wireless communication devices. Cost reduction and consumer demand have proliferated the use of wireless communication devices such that they are practically ubiquitous in modern society. As the use of wireless communication devices has expanded, so has the demand for new and improved features of wireless communication devices. More specifically, wireless communication devices that perform new functions, or that perform functions faster, more efficiently or more reliably are often sought after.

A wireless communication device may make use of one or more wireless communication technologies over a network. A wireless local area network (WLAN), a wireless personal area network (WPAN), or an Internet of Things (IoT) network may be formed by a number of wireless communication devices that share a wireless communication medium. Such a network may be an example of an ad hoc network in which the devices can communicate directly with one another via wireless links. For example, the network may be a Bluetooth® network and the devices may be Bluetooth®-compliant devices. A Bluetooth®-compliant device can be any device that implements one or more of the Bluetooth® wireless communication protocols as defined by the IEEE 802.15 standards or the Bluetooth Special Interest Group (SIG) standards, for example, including the Bluetooth 4.0 Specification and the Bluetooth 5.0 Specification.

"Smart" devices, especially those using Bluetooth®, Bluetooth Low Energy (BLE), or BLE mesh networks, have benefitted from such advances in electronic technology. Smart devices include "smart" appliances (also marketed as network-connected appliances), such as smart refrigerators, smart washing machines and dryers, smart coffee machines, etc., that can be controlled or automated over a wireless communication network. While such smart appliances continue to increase in popularity, deployment of smart technology within an environment may be cost prohibitive, or unavailable in some markets. Additionally, there are inherent disadvantages associated with replacement of existing appliances with newer smart appliances. Such disadvantages include the cost to consumers for replacement of traditional appliances with smart appliances, and the waste disposal of discarded appliances.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method of communication amongst a plurality of smart sockets. The plurality of smart sockets can communicate with one another in a Bluetooth Low Energy (BLE) mesh network. The method includes monitoring, at a first smart socket, data related to a power source; processing, at the first smart socket, the power source data; sending the processed power source data to one or more of the plurality of smart sockets via the BLE mesh network; comparing, at the one or more of the plurality of smart sockets, the processed power source data to a configurable value; and based on the comparison of the processed power source data to the configurable value, updating an operation of the one or more of the plurality of smart sockets.

In some implementations, the configurable value includes a power threshold value. In some implementations, when the power source data exceeds the power threshold value, the updating includes powering down the one or more of the plurality of smart sockets.

In some implementations, processing the power source data includes determining if the power source is a backup power source. In some implementations, the configurable value includes an electrical load categorization. In some implementations, when the electrical load categorization is a first category, the updating includes powering down the one or more of the plurality of smart sockets. In some implementations, when the electrical load categorization is a second category, the updating includes operating the one or more of the plurality of smart sockets in a lower power mode. In some implementations, when the electrical load categorization is a third category, the updating includes operating the one or more of the plurality of smart sockets in an low power alternative mode. In some implementations, when the electrical load categorization is a fourth category, the updating includes operating the one or more of the plurality of smart sockets in an active mode.

In some implementations, the power source data indicates a period of high electricity tariff. In some implementations, the configurable value includes a time category. In some implementations, when the time category is non-time critical, the updating includes deferring operation of the one or more of the plurality of smart sockets until the period of high electricity tariff expires. In some implementations, when the time category is time critical, the updating includes operating the one or more of the plurality of smart sockets in an active mode.

In some implementations, processing the power source data includes determining if the power source is a renewable energy power source. In some implementations, when the time category is non-time critical, the updating includes operating the one or more of the plurality of smart sockets in an active mode via the renewable energy power source.

Another innovative aspect of the subject matter described in this disclosure can be implemented in an apparatus in wireless communication with at least one of a plurality of smart sockets. The apparatus including a processor and memory in electronic communication with the processor. The apparatus includes instructions stored in the memory and operable, when executed by the processor, to cause the apparatus to monitor data related to a power source; process the power source data; and send the processed power source data to the at least one of the plurality of smart sockets. The at least one of the plurality of smart sockets compares the processed power source data to a configurable value, and based on the comparison of the processed power source data to the configurable value, the at least one of the plurality of smart sockets updates its operation.

In some implementations, the configurable value includes a power threshold value. In some implementations, when the power source data exceeds the power threshold value, the updating its operation includes powering down the at least one of the plurality of smart sockets.

In some implementations, processing the power source data includes determining if the power source is a backup power source. In some implementations, the configurable value includes an electrical load categorization. In some implementations, when the electrical load categorization is a first category, the updating its operation includes powering down the at least one of the plurality of smart sockets. In some implementations, when the electrical load categorization is a second category, the updating its operation includes operating the at least one of the plurality of smart sockets in a lower power mode. In some implementations, when the electrical load categorization is a third category, the updating its operation includes operating the at least one of the plurality of smart sockets in an low power alternative mode. In some implementations, when the electrical load categorization is a fourth category, the updating its operation includes operating the at least one of the plurality of smart sockets in an active mode.

In some implementations, the power source data indicates a period of high electricity tariff. In some implementations, the configurable value includes a time category. In some implementations, when the time category is non-time critical, the updating its operation includes deferring operation of the at least one of the plurality of smart sockets until the period of high electricity tariff expires. In some implementations, when the time category is time critical, the updating its operation includes operating the at least one of the plurality of smart sockets in an active mode. In some implementations, the processing the power source data includes determining if the power source is a renewable energy power source, and when the time category is non-time critical, the updating its operation includes operating the at least one of the plurality of smart sockets in an active mode via the renewable energy power source.

Another innovative aspect of the subject matter described in this disclosure can be implemented in a computer-readable medium having instructions stored therein to cause a processor of a smart socket in wireless communication with a plurality of smart sockets to: monitor data related to a power source; process the power source data; and send the processed power source data to one or more of the plurality of smart sockets via a wireless network. The one or more of the plurality of smart sockets compares the processed power source data to a configurable value, and based on the comparison of the processed power source data to the configurable value, the one or more of the plurality of smart sockets updates its operation.

In some implementations, the configurable value includes a power threshold value. In some implementations, when the power source data exceeds the power threshold value, the updating its operation includes powering down the one or more of the plurality of smart sockets.

In some implementations, processing the power source data includes determining if the power source is a backup power source. In some implementations, the configurable value includes an electrical load categorization. In some implementations, when the electrical load categorization is a first category, the updating its operation includes powering down the one or more of the plurality of smart sockets. In some implementations, when the electrical load categorization is a second category, the updating its operation includes operating the one or more of the plurality of smart sockets in a lower power mode. In some implementations, when the electrical load categorization is a third category, the updating its operation includes operating the one or more of the plurality of smart sockets in an low power alternative mode. In some implementations, when the electrical load categorization is a fourth category, the updating its operation includes operating the one or more of the plurality of smart sockets in an active mode.

In some implementations, the power source data indicates a period of high electricity tariff. In some implementations, the configurable value includes a time category. In some implementations, when the time category is non-time critical, the updating its operation includes deferring operation of the one or more of the plurality of smart sockets until the period of high electricity tariff expires. In some implementations, when the time category is time critical, the updating its operation includes operating the one or more of the plurality of smart sockets in an active mode.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
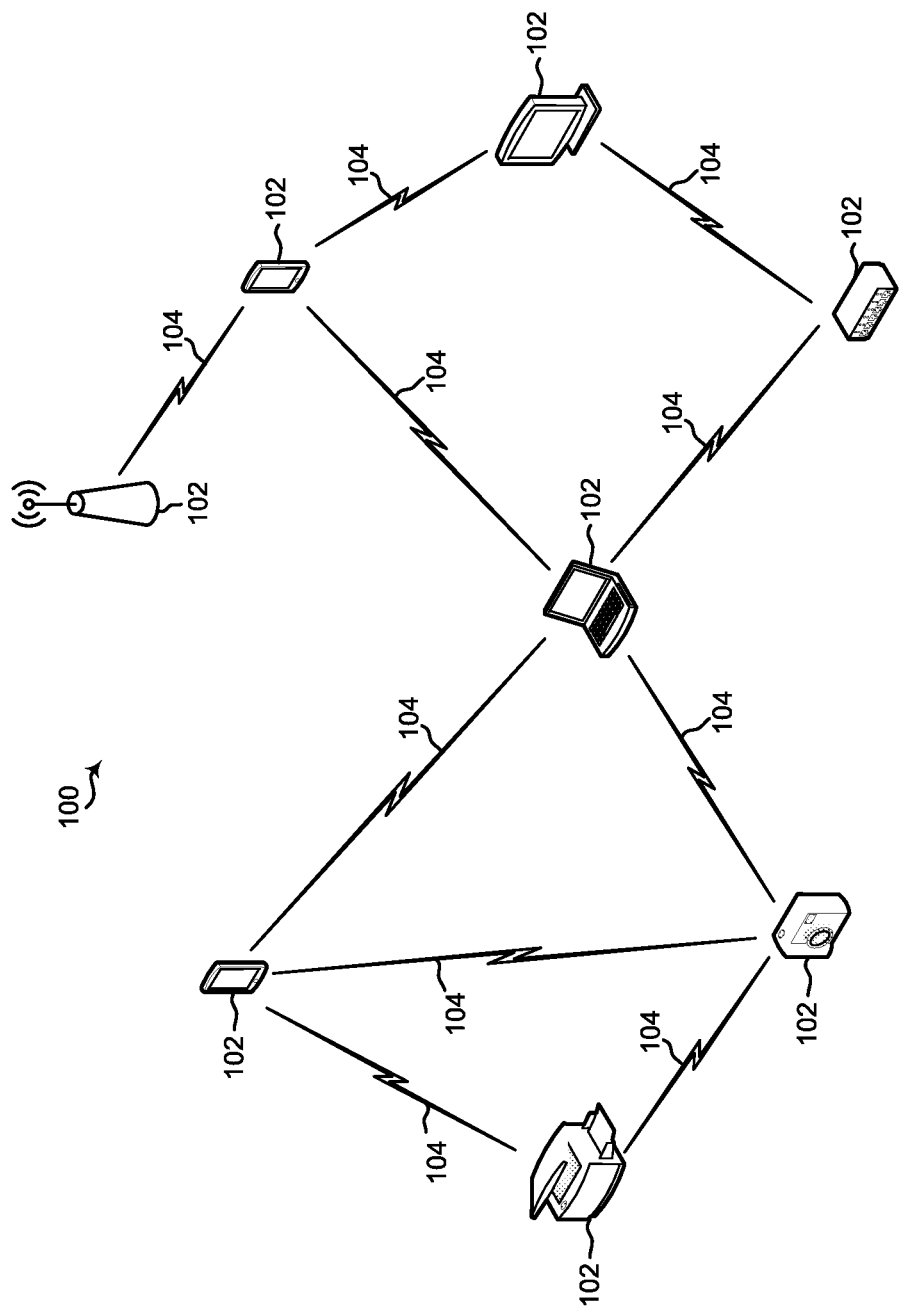
FIG. 1 shows a diagram of an example wireless communication network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards (i.e., Wi-Fi), the IEEE 802.3 Ethernet standards, and the IEEE 1901 Powerline communication (PLC) standards. However, the described implementations may be implemented in any device, system or network that is capable of transmitting and receiving RF signals according to any of the wireless communication standards, including any of the IEEE 802.11 standards, the IEEE 802.15 Bluetooth® standards, Bluetooth low energy (BLE), code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G, 5G, or 6G, or further implementations thereof, technology.

A "smart" appliance is any appliance which can be controlled, automated, or managed using a network-based command protocol. Some manufacturers may market smart appliances as network-connected appliances, Internet-of-Things (or "IOT") devices, smart home devices, and the like. A traditional appliance (such as a coffee machine, refrigerator, lamp, washing machine, dryer, dishwasher, toaster, microwave, or the like) is any appliance that was not traditionally intended to operate on a network. Traditionally, such appliances cannot be controlled, automated, or managed by a network-based command protocol. In some implementations, a traditional appliance may be equipped with a control circuit, however, the traditional appliance may not have a network interface for communicating via a network, or may be in a location where wireless network communication is unstable, unavailable, or unreliable. Network-enablement of traditional appliances may enable smart control or automation over the traditional appliance. Because it may be costly for a consumer to replace traditional appliances with newer or upgraded smart appliances, providing a network interface with a common command protocol may enable a user to enjoy smart control features on a traditional appliance while reducing cost and complexity.

Smart sockets, or smart plugs, which are plugged into an electrical power outlet or receptacle, include wireless network-enablement capabilities, and can provide the network interface necessary to provide traditional appliances with smart control features. As such, intelligence, or "smarts," can be provided to traditional appliances electrically connected, or plugged in, to the smart socket. An electronic device, or smart appliance controller, communicating with the smart socket over a wireless network can be implemented to, for example, remotely turn the traditional appliance on/off on command, or according to a programmed schedule or routine. In some implementations, the smart socket can be implemented to receive voice commands, and in response to the voice commands can, for example, turn the traditional appliance on/off.

Data associated with operation of the traditional appliance or the smart socket can be sent to a software application, or "app", residing on the electronic device or smart appliance controller. Alternatively, the data can be sent to the "cloud" and viewable over an Internet connection. Such data can include basic information like the state of the traditional appliance (on versus off), how long the traditional appliance was in use (seconds, minutes, hours, days, weeks, etc.), the location of the traditional appliance (such as the kitchen, bedroom, living room, etc.), the power consumption of the traditional appliance, etc. Processing, or analyzing, such data can result in a better understanding of the utilization of each traditional appliance within the smart home environment. In this disclosure, implementations will be described in the context of a smart home environment, however, the teachings herein can be applied to commercial locations, manufacturing locations, or any environment in which smart appliances might be useful.

While smart sockets continue to increase in popularity, they tend to ignore the overall environment that the traditional appliance is operating in, and as such, are not used optimally. In this disclosure, an intelligent connected power socket, or smart socket, can enable network-based control over a traditional appliance, and can enable optimization of the traditional appliance's utilization. The smart socket, or a plurality of smart sockets, can be implemented to establish a first communication link with an electronic device, or a smart appliance controller, in a network. The smart socket, or a plurality of smart sockets, can establish a second communication link with the traditional appliance, such as via a control circuit. The smart socket, or a plurality of smart sockets, can receive a command (such as an automation command) from the electronic device, or smart appliance controller, and send a signal to the control circuit to control an operation of the traditional appliance in accordance with the command. Using the techniques in this disclosure, a traditional appliance (such as a traditional coffee machine, refrigerator, lamp, washing machine, dryer, dishwasher, toaster, microwave, light bulb, etc.) plugged into, or connected to, a smart socket can be configured to operate like a smart appliance.

In some implementations, the smart socket, or a plurality of smart sockets, may establish the first communication link with the electronic device, or smart appliance controller, using a wireless connection, such as over a wireless local area network (WLAN), a wireless personal area network (WPAN), an Internet of Things (IoT) network, or a wide area network (WWAN) connection, such as 3G, 4G or 5G. Such a configuration can enable control of appliances in a location via a remote Internet connection even if the user, electronic device, or smart appliance controller, is not physically near the local network where those appliances are located. A smart socket that connects to the Internet using a wireless connection may serve as a gateway for other smart sockets. For example, a group, or a plurality, of smart sockets may communicate with each other over a WLAN WPAN, IoT, or WWAN network. For example, the group of smart sockets can be implemented to coordinate and communicate wirelessly among themselves using one or more of a Wi-Fi, Bluetooth®, Bluetooth Low Energy (BLE), BLE mesh (defined in the Mesh Profile Specification or Mesh Model Specification), ZigBee, Low Power IoT, or 5G network. In some implementations, the group of smart sockets can use multiple network connections, such as in a mesh network topology, which may provide increased resiliency and coverage within the smart home environment.

Particular implementations of the subject matter described in this disclosure can be implemented to realize one or more of the following potential advantages. By employing smart sockets in the smart home environment, traditional appliances can be configured with features associated with smart appliances. This enables consumers to continue utilizing less expensive, or existing traditional appliances, while controlling the traditional appliance as if it was a smart appliance. A smart socket, or a plurality of coordinating smart sockets, as described herein can be implemented to monitor one or more power quality characteristics of the power supply providing energy to the smart home environment. Smart sockets implemented to monitor power quality characteristics can sense when power fluctuations are present in the power supply, and shut down its respective connected device to prevent damage. The smart socket detecting power fluctuations also can turn off other appliances connected or subscribed to the smart socket, which may not have power supply sensing capabilities. Additionally, the smart socket, or a plurality of coordinating smart sockets, can be implemented to optimize power utilization when the smart home environment is operating on backup power. Moreover, the smart socket, or the plurality of coordinating smart sockets, can be implemented to optimize power during low electricity tariff periods, or when operating on a renewable energy source. Furthermore, the smart socket, or the plurality of coordinating smart sockets, can be implemented to autonomously schedule tasks based on a context of operation of other devices in the smart home environment. Finally, the smart socket, or the plurality of coordinating smart sockets, can be implemented to achieve configurable energy targets for the smart home environment.

FIG. 1 shows a diagram of an example wireless communication network 100. In various implementations, the wireless communication network 100, or wireless network, can be an example of a wireless local area network (WLAN) or a wireless personal area network (PAN). The wireless communication network (hereinafter "wireless network") 100 may include multiple wireless communication electronic devices 102. The wireless communication electronic devices also may be known as an electronic device. An electronic device also may be referred to as a smartphone, a mobile device, wireless device, a wireless node, a receiver device, a remote device, a handheld device, or a subscriber device, or some other suitable terminology, where the "device" also may be referred to as a unit, a station, a terminal, or a client. The electronic device may be implemented as any computing device configured to receive, process and otherwise handle information, including audio or visual or audio/visual (i.e., video), over a communications network. The electronic device also may be a cellular phone, a personal digital assistant (PDA), a laptop or laptop computer, a tablet device, a personal computer, a gaming console, a virtual or augmented reality device, a drone, an Internet of Things (IoT) device, or other electronic system. IoT devices also may be referred to as an Internet of Everything (IoE) device, an IoT hub, and IoE hub, or any other physical device, vehicle, or home appliance that is embedded with electronics and network connectivity, which enable these objects to connect and exchange data. The IoT device also may be referred to as a virtual assistant device, such as Amazon Alexa®, Google Home®, etc., a wearable device, such as smart watches, Google Glass®, etc., an in-vehicle entertainment or communication system, a home security system, or any device having an interface, such as a network interface, to a communications network and suitable input and output devices. Wearable devices also may be referred to as wearable technology, wearable gadgets, wearables, or some other suitable terminology, which generally describes electronics and software-based technology that is worn on the body, either as an accessory, or as part of material used in clothing. Additionally, the electronic device can be implemented as a display device (for example, TVs, computer monitors, navigation systems, among others), music or other audio or stereo devices (for example, audio headphones or ear buds), remote control devices ("remotes"), printers, copiers, kitchen or other household appliances, and key fobs (for example, for passive keyless entry and start (PKES) systems).

The wireless communication network 100 can be implemented as an ad hoc, peer-to-peer (P2P) or mesh network. The electronic devices 102 can communicate directly with one another via wireless links 104. In some implementations, the wireless communication network 100 is a Wi-Fi network and defined by the IEEE 802.11 family of standards (including, but not limited to, 802.11n, 802.11ac, 802.11ah, 802.11ad, 802.11ay, 802.11ax, 802.11az, 802.11ba and 802.11be). In some other implementations, the wireless communication network 100 is an example of a Bluetooth® network and the electronic devices 102 are Bluetooth®-compliant devices. In some further implementations, the wireless communication network 100 can include one or more of the following wireless communication technologies: Bluetooth Low Energy (BLE), BLE mesh, ZigBee, Low Power IoT, or 5G.

A Bluetooth® device can be any device, such as a Bluetooth-compliant electronic device 102, that implements one or more of the Bluetooth® wireless communication protocols as defined by the IEEE 802.15 standards or the Bluetooth Special Interest Group (SIG) standards, for example, including the Bluetooth 4.0 Specification and the Bluetooth 5.0 Specification. Bluetooth refers to a set of short-range wireless communication protocols including the Basic Rate (BR) core configuration, the Enhanced Data Rate (EDR) configuration, and the Low Energy (LE) core configuration as, for example, defined in the Bluetooth SIG 4.0 and 5.0 Specifications. Both the BR physical layer (PHY) and the LE PHY operate in the unlicensed Industrial, Scientific and Medical (ISM) 2.4 GHz short-range radio frequency band (2400-2483.5 MHz) and may utilize frequency-hopping spread spectrum radio technology and shaped, binary frequency modulation.

Bluetooth-compliant electronic devices 102 may transmit and receive Bluetooth communications (for example, in the form of Bluetooth packets) to and from one another over wireless links 104 (hereinafter also referred to as "Bluetooth links"). In some implementations, the electronic devices 102 can operate according to a master/slave architecture. In the master/slave architecture, one of the electronic devices 102, referred to as the master, provides clock synchronization to the other electronic devices 102, which are referred to as slaves. During typical operation, a physical radio channel can be shared by multiple electronic devices 102 (referred to as a "piconet"). The electronic devices 102 of a Bluetooth piconet are synchronized to the common clock and frequency (channel) hopping pattern specified by the master. A master electronic device 102 may have PHY links with multiple slave electronic devices 102 simultaneously. Similarly, a slave electronic device 102 may be permitted to have PHY links to more than one master electronic device 102 at a time. Additionally, an electronic device 102 may be permitted to have the role of both master and slave at the same time; for example, an electronic device 102 may be a master as it pertains to a first PHY link with another Bluetooth device while simultaneously being a slave as it pertains to a second PHY link with yet another Bluetooth device. Additionally, or alternatively, the electronic devices 102 may transmit and receive Bluetooth packets according to a broadcaster/scanner architecture, described in further detail below.

According to the Bluetooth Specifications, packets are communicated via a logical link control and adaptation protocol (L2CAP) channel, which is layered over logical links and logical transports, which are in turn built on physical links, physical channels and physical transports. The BR logical transports include the Synchronous Connection-Oriented (SCO), extended SCO (eSCO), Asynchronous Connection-Less (ACL), Active Slave Broadcast (ASB) and Connectionless Slave Broadcast (CSB) logical transports. Both the synchronous and the asynchronous logical transports may represent point-to-point links between a master electronic device 102 and a respective slave electronic device 102. The master electronic device 102 maintains the synchronous logical transports using reserved time slots at regular intervals to transmit SCO and eSCO packets. The master electronic device 102 can establish an ACL logic transport on a per-slot basis to transmit ACL packets to any slave electronic device 102 in the time slots not reserved for SCO and eSCO packets.

The BR PHY supports a BR mode having a bit rate of 1 Mbps, and an EDR mode having a bit rate of 2 or 3 Mbps. Each BR packet (for example, in the form of a protocol data unit (PDU)) generally includes three portions: an access code, a header and a payload (which, in some implementations, may have zero length). The access code includes a preamble used for DC offset compensation, a sync word used for timing acquisition and synchronization, and optionally a trailer. The access code also can be used for identification purposes. In some implementations, all packets transmitted in a single physical channel share the same access code. The packet header includes the link control information including a logical transport address and a packet type identification. In master-to-slave transmissions, the logical transport address indicates the destination slave electronic device 102 (or multiple slaves in the case of broadcast transmissions) by which the packet is intended to be received, while in slave-to-master transmissions, the logical transport address indicates the source electronic device 102 transmitting the packet.

The Bluetooth LE (BLE) core configuration is particularly designed to enable electronic devices 102 having relatively lower current consumption, complexity and cost than BR- or EDR-supporting electronic devices 102. For example, BLE may be especially advantageous for use cases and applications requiring lower data rates and duty cycles. LE electronic devices 102 may support three PHY modes ("PHYs"): LE 1M, LE 2M and LE Coded, supporting bit rates of 1 megabit per second (Mbps), 2 Mbps, and either 125 kilobits per second (kpbs) or 500 kpbs (depending on the coding), respectively. LE supports both frequency division multiple access (FDMA) and time division multiple access (TDMA) schemes. Forty physical channels separated by 2 MHz may be used in the FDMA scheme. For TDMA, a polling scheme can be used in which one device transmits at a predetermined time and a corresponding device responds after a predetermined time interval. The LE logical transports include the LE asynchronous connection (LE ACL), LE Advertising Broadcast (ADVB) and LE Periodic Advertising Broadcast (PADVB) logical transports. Each LE packet (PDU) generally includes a preamble, an access address (including an access code), a PDU header and a PDU payload. LE packets also may include a message integrity check (MIC) and a cyclic redundancy check (CRC) following the payload.

In the BLE core configuration, several physical channels are defined including advertising, periodic, data and isochronous channels. The physical channels are divided into time units called events during which the electronic devices 102 may communicate with one another. These events may in turn be sub-divided into sub-events (also referred to herein simply as "events"). For example, such events may include advertising events, connection events and isochronous events. The electronic devices 102 transmit particular types of packets associated with particular types of events on particular physical channels. For example, each connection event is initiated by a master electronic device 102 via a connection creation procedure. Frequency channel hopping can occur at the start of each connection event. Connection events may be used to transmit asynchronous data PDUs ("data packets") between the electronic devices 102 via the data channels.

Advertising events may be used to transmit advertising channel PDUs ("advertising packets") via one or more advertising channels to establish pair-wise bidirectional communications via data channels, periodic broadcasts via secondary advertising channels, or isochronous broadcasts via isochronous channels. For example, if an advertising device ("advertiser") is using a connectable advertising event, the initiating device ("initiator") may make a connection request using the same advertising PHY channel on which it received the advertising packet. If the advertiser receives and accepts the connection request, a connection is established and the initiator becomes the master device while the advertiser becomes a slave device. For example, ADV_EXT_IND and ADV_AUX_IND PDUs ("packets") may be transmitted during extended advertising events for scanning purposes or to initiate other devices, while AUX_SYNC_IND PDUs ("packets") may be transmitted during periodic advertising events also for scanning purposes.

Isochronous events may be used to transmit isochronous PDUs ("isochronous packets") between the electronic devices 102 via isochronous channels. There are two general categories of isochronous communications: those between connected electronic devices 102 and those between unconnected electronic devices 102. During an isochronous event exchange between connected electronic devices 102, master and slave electronic devices 102 may communicate over a point-to-point logical transport called a Connected Isochronous Stream (CIS) to exchange isochronous data. During an isochronous event exchange between unconnected electronic devices 102, a broadcasting electronic device ("broadcaster") 102 may use a connectionless logical transport called a Broadcast Isochronous Stream (BIS) to broadcast isochronous data in a unidirectional, connectionless manner to multiple receiving electronic devices 102 referred to as scanning devices ("scanners") forming a Broadcast Isochronous Group (BIG).

The electronic devices 102 may include or be implemented with security features for pairing, bonding, authentication, encryption and message integrity. For example, pairing involves generating one or more shared secret keys, bonding involves storing the keys for use in subsequent connections, and authentication involves verifying that two devices have the same keys. Encryption may be used to ensure message confidentiality and message integrity may protect against forgeries.

Figure 2:
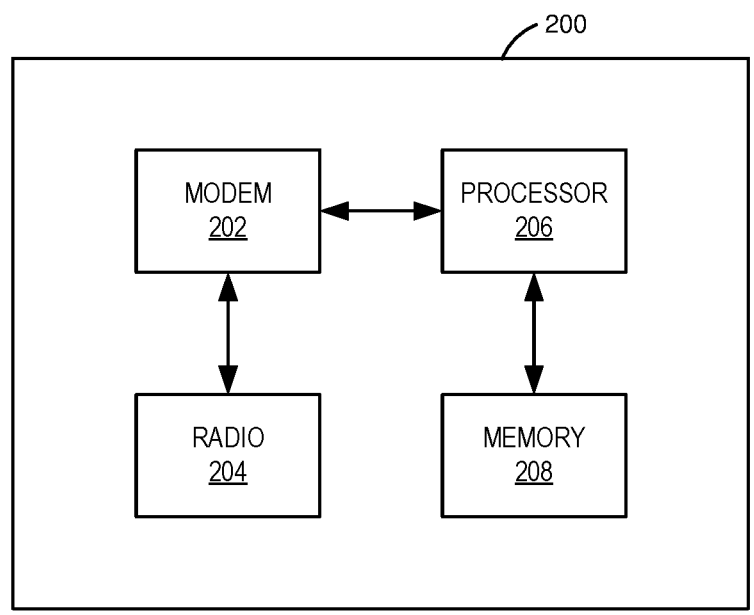
FIG. 2 shows a block diagram of an example wireless communication device.

FIG. 2 shows a block diagram of an example wireless communication device 200. In some implementations, the wireless communication device 200 can be an example of one of the electronic devices 102 described above with reference to FIG. 1. The wireless communication device 200 is capable of outputting and receiving wireless communications (for example, in the form of wireless packets). For example, the wireless communication device can be configured to output and receive packets in the form of protocol data units (PDUs) conforming to an IEEE 802.15 standard or one or more of the Bluetooth® standards defined by the Bluetooth SIG. The wireless communication device 200 can be or can include a chip, system on chip (SoC), chipset, package or device that includes one or more modems 202, for example, a Bluetooth-compliant modem. In some implementations, the one or more modems 202 (collectively "the modem 202") additionally include a WLAN modem (for example, an IEEE 802.11-compliant modem). In some implementations, the wireless communication device 200 also includes one or more radios 204 (collectively "the radio 204"). In some implementations, the wireless communication device 200 further includes one or more processors, processing blocks or processing elements 206 (collectively "the processor 206") and one or more memory blocks or elements 208 (collectively "the memory 208").

The modem 202 is generally configured to implement a physical (PHY) layer. For example, the modem 202 is configured to modulate packets and to provide the modulated packets to the radio 204 for transmission over the wireless medium. The modem 202 is similarly configured to obtain modulated packets received by the radio 204 and to demodulate the packets to provide demodulated packets. In addition to a modulator and a demodulator, the modem 202 may further include digital signal processing (DSP) circuitry, automatic gain control (AGC), a coder, a decoder, a multiplexer and a demultiplexer.

The radio 204 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers are in turn coupled to one or more antennas. The symbols output from the modem 202 are provided to the radio 204, which then transmits the symbols via the coupled antennas. Similarly, symbols received via the antennas are obtained by the radio 204, which then provides the symbols to the modem 202.

The processor 206 can include an intelligent hardware block or device such as, for example, a processing core, a processing block, a central processing unit (CPU), a microcontroller, an application-specific integrated circuit (ASIC), or a programmable logic device (PLD) such as a field programmable gate array (FPGA), among other possibilities. The processor 206 processes information received through the radio 204 and the modem 202, and processes information to be output through the modem 202 and the radio 204 for transmission through the wireless medium. For example, the processor 206 may implement a MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 206 may generally control the modem 202 to cause the modem to perform various operations described above.

The memory 204 can include random access memory (RAM) and read-only memory (ROM). The memory 204 also can store processor- or computer-executable software (SW) code containing instructions that, when executed by the processor 206, cause the processor to perform various operations described herein for wireless communication, including the generation, transmission, reception and interpretation of MPDUs, frames or packets.

Figure 3:
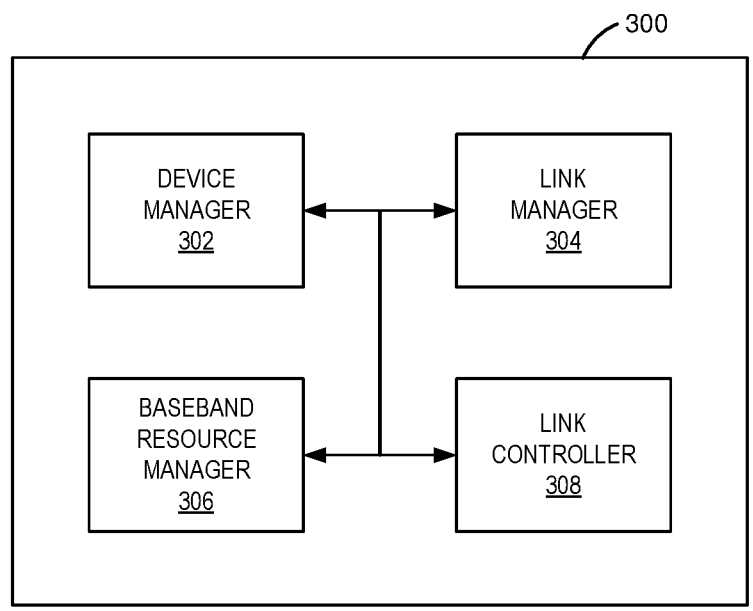
FIG. 3 shows a block diagram of an example media access control (MAC) layer.

FIG. 3 shows a block diagram of an example media access control (MAC) layer 300. For example, the MAC layer 300 may be an example of a MAC layer implemented by the processor 206 described with reference to FIG. 2. In the illustrated implementation, the MAC layer 300 includes a device manager 302, a link manager 304, a baseband resource manager 306 and a link controller 308. The device manager 302 controls the general behavior of the Bluetooth system and is responsible for discovery and for connecting to other Bluetooth devices, and generally all operations not directly related to data transport. The link manager 304 manages the creation, modification and termination of logical links (including the associated logical transports) as well as the updating of parameters related to the physical links. The baseband resource manager 306 manages access to the wireless medium and is configured to perform scheduling and to enforce QoS requirements. The link controller 308 manages the encoding and decoding of packets.

Figure 4:
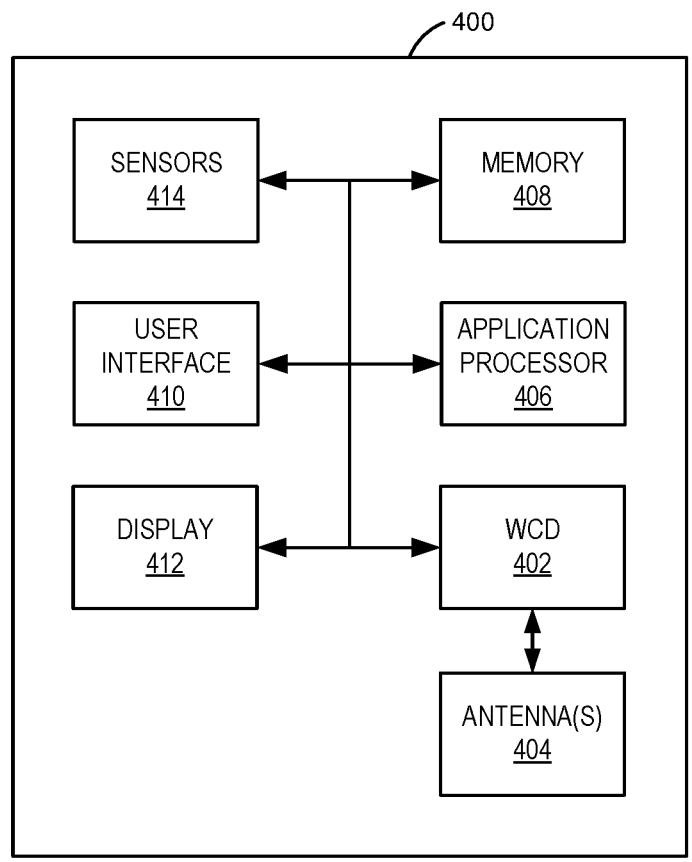
FIG. 4 shows a block diagram of an example electronic device.

FIG. 4 shows a block diagram of an example electronic device 400. The electronic device 400 can be an example implementation of the electronic device 102 described with reference to FIG. 1. The electronic device 400 includes a wireless communication device 402. For example, the wireless communication device 402 may be an example implementation of the wireless communication device 200 described with reference to FIG. 2. The electronic device 400 also includes one or more antennas 404 coupled with the wireless communication device 402 to transmit and receive wireless communications. The electronic device 400 additionally includes an application processor 406 coupled with the wireless communication device 402, and a memory 408 coupled with the application processor 406. In some implementations, the electronic device 400 further includes a user interface (UI) 410 (such as a touchscreen or keypad) and a display 412, which may be integrated with the UI 410 to form a touchscreen display. In some implementations, the electronic device 400 may further include one or more sensors 414 such as, for example, one or more inertial sensors, accelerometers, temperature sensors, pressure sensors, or altitude sensors. One or more of the aforementioned components can communicate with other components directly or indirectly, such as over one or more bus interfaces.

Figure 5:
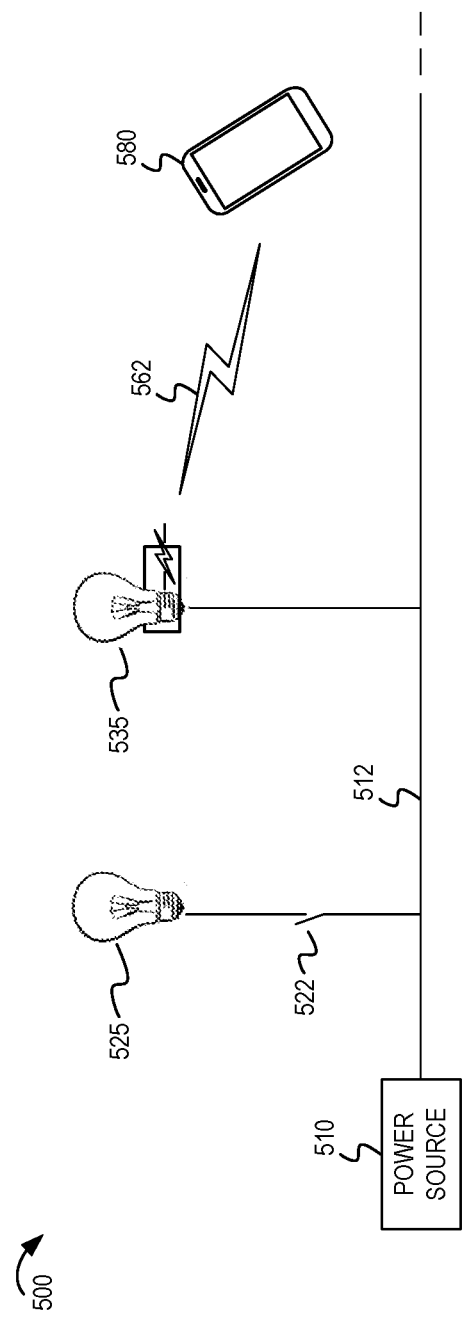
FIG. 5 shows an example system diagram of traditional appliances in a smart home environment.

FIG. 5 shows an example system diagram 500 of traditional appliances in a smart home environment. The system diagram 500 includes a power source 510 which provides power over electrical wiring via an electric power transmission line 512. In some implementations, the electric power transmission line 512 can include powerline communications (PLC) technology. A first appliance 525 (such as a traditional light bulb) may be coupled to the electric power transmission line 512 via a switch 522. For example, the switch 522 may be a wall switch, dial or dimmer, which requires manual operation to turn on or turn off the light. Neither the first appliance 525 nor the switch 522 are capable of being controlled by a network-based command protocol because they both lack a network interface.

The system diagram 500 also shows a second appliance 535 which receives power from the electric power transmission line 512. The second appliance 535 (such as a "smart light bulb") may be capable of receiving a command from an electronic device 580 because it may have a wireless network interface, or have communication capability built into the second appliance 535. For example, the electronic device 580 may send a command via a wireless link 562 (such as Wi-Fi or Bluetooth®) to the second appliance 535. To take advantage of such smart home-enabled automation, a consumer might replace an existing traditional appliance (such as the first appliance 525) with a new appliance (such as the second appliance 535). However, a cost-conscientious consumer may not want to replace traditional appliances with new appliances. Furthermore, there may be many different types of traditional appliances (such as various brands or types of equipment) within a home environment that may not communicate compatibly. The ability to quickly network traditional appliances and use a standard command protocol within the home or commercial environment may increase the rate of adoption for smart controller technology and improve compatibility or consistency for controlling the different types of traditional appliances.

Figure 6:
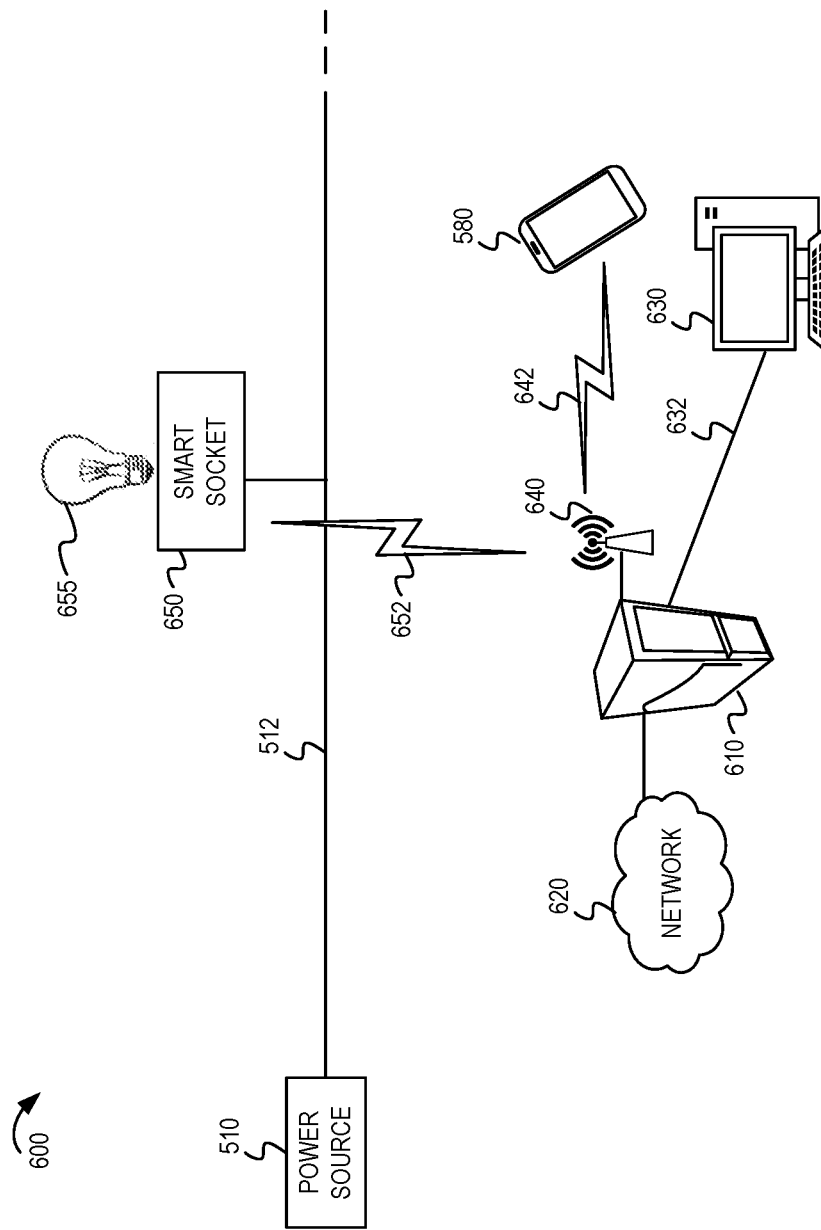
FIG. 6 shows a system diagram of an example smart socket for networking a traditional appliance via a wireless local area network (WLAN).

FIG. 6 shows a system diagram 600 of an example smart socket for networking a traditional appliance via a wireless local area network (WLAN). The system diagram 600 includes the power source 510 and electric power transmission line 512. The electric power transmission line 512 provides power to a traditional appliance 655 via a smart socket 650. The smart socket 650 is configured to control the operation of the traditional appliance 655 by managing the power delivered from the electric power transmission line 512 to the traditional appliance 655. For example, the smart socket 650 may send a signal to a control circuit (not shown) that controls power to the traditional appliance 655.

As found in many homes and businesses, a local network may be present in the system diagram 600. For example, a router 610 (also known as a gateway) may provide network connectivity between electronic devices and a network 620. In the system 600, two electronic devices 580, 630 are communicatively coupled to the router 610. A first electronic device 580 (shown as a mobile device) may have a WLAN communication link 642 to an access point 640. The access point 640 may be separate from the router 610 or may be integrated (or collocated) with the router 610. A second electronic device 630 (shown as a stationary computer) may have a physical communication link 632 (such as Ethernet) to the router 610. The smart socket 650 also may have a WLAN communication link 652 via the access point 640 to the router 610.

In FIG. 6, the router 610 may operate as a smart appliance controller. For example, the router 610 may include a home automation platform for controlling a smart appliance or smart socket 650. In some implementations, the smart appliance controller can reside within the router 610. In some other implementations, the smart appliance controller may be separate from the router and may be communicatively coupled to the router 610. In some implementations, the smart appliance controller can be incorporated in the electronic device 580. For example, the smart appliance controller can be an application stored in memory of the electronic device 580. In some other implementations, the smart appliance controller can be incorporated into a virtual assistant device, such as Amazon Alexa®, Google Home®, etc. In some further implementations, the smart appliance controller can be incorporated into a smart hub, such as Samsung SmartThings®, etc. In any of such implementations, the smart appliance controller may use a standard command protocol associated with smart home automation. The smart appliance controller can send commands over one or more network communication links to the appropriate smart appliance or smart socket 650. In response to receiving the command, the smart socket 650 may send a signal to a control circuit associated with the traditional appliance 655. The signal may cause the control circuit to enable (or disable) power from the electric power transmission line 512 to the traditional appliance 655. The smart socket 650 may control operation of the traditional appliance 655 as if the traditional appliance 655 was a smart appliance responding to a command from the router 610, even though the traditional appliance 655 may itself not be capable of processing the command. In some implementations, the smart socket 650 may translate the command from the standard command protocol used by the smart appliance controller into a signal that is appropriate for the control circuit. For example, the smart socket 650 may establish a different communication link (not shown) with the control circuit that is different from the WLAN communication link 652.

In some implementations, a group of smart sockets (not shown) may coordinate with each other to form a mesh network using one or more communication links. For example, some smart sockets may support WLAN, PAN or wireless broadband communication links. In some implementations, the smart sockets may communicate using mobility management entity (MME) messaging to coordinate with each other to control different types of appliances through the mesh network.

Figure 7:
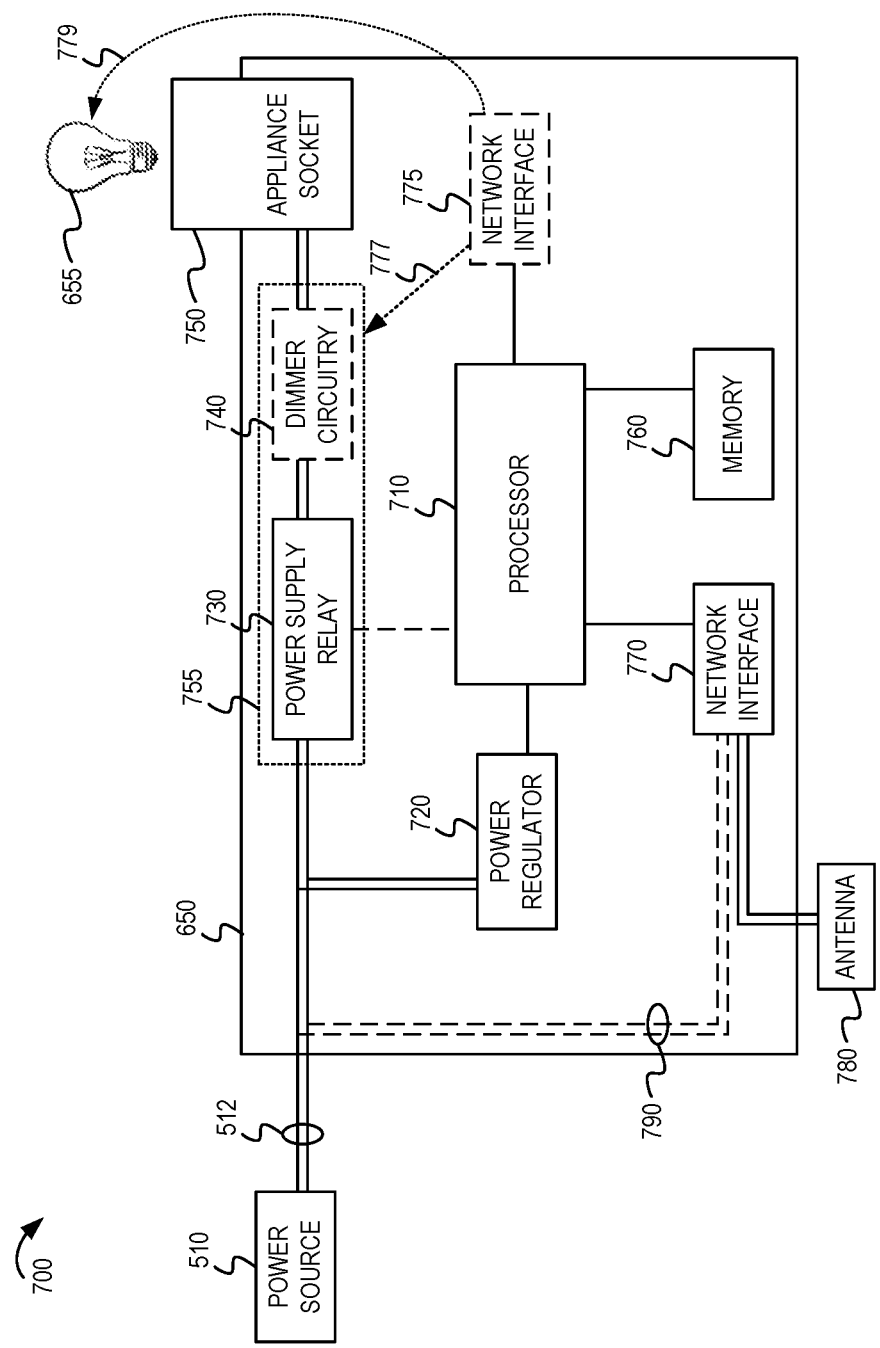
FIG. 7 shows a block diagram of an example smart socket.

FIG. 7 shows a block diagram 700 of an example smart socket. The block diagram 700 depicts the power source 510, smart socket 650, and traditional appliance 655. The smart socket 650 includes an appliance socket 750 for coupling to the traditional appliance 655. The smart socket 650 includes a processor 710, memory 760, and at least one network interface (such as network interface 770).

In some implementations, the power may be supplied via a control circuit 755 (such as a power supply relay 730 and, optionally, a dimmer circuitry 740). The power supply relay 730 may control whether the power from the power source 510 can reach the appliance socket 750. In some implementations, the control circuit 755 may be located in or near the appliance socket 750. In some other implementations, the control circuit 755 may be integrated with the smart socket 650 (as shown in FIG. 7) or may be separate. When the control circuit 755 is located in the smart socket 650, the power supply relay 730 may be enabled or disabled by the processor 710. In some implementations, an isolator circuit (not shown) can be used between the processor 710 and the power supply relay 730. Examples of an isolator circuit may include an optocoupler or any type of isolator circuitry to protect the processor 710 from a failure of the power supply relay 730, or vice versa. In some implementations, a solid-state relay (not shown) may be used in place of the power supply relay 730 and isolator circuit.

The processor 710 also may utilize power from the power source 510. In FIG. 7, a power regulator 720 is shown. For example, the power regulator 720 may convert AC power to DC power. The power regulator 720 also may regulate or change the amount of voltage supplied to the processor 710. In some other implementations, the processor 710 may be powered by a battery or wireless power source. Alternatively, the power source 510 may be a battery or wireless power receiver and may be integrated with the smart socket 650. In some implementations, the same power source that provides power to the traditional appliance 655 (via the appliance socket 750) is also used to provide power to the processor 710.

The processor 710 is configured to receive commands from an electronic device or a smart appliance controller via a network. The network interface 770 provides connectivity between the smart socket 650 and the network. In some implementations, the network interface 770 may be a PAN interface which communicates via an antenna 780. For example, the PAN interface may be configured to implement Bluetooth-based technologies, such as BLE mesh. In some other implementations, the network interface 770 may be a WLAN interface which communicates via the antenna 780. For example, the WLAN interface may be configured to implement Wi-Fi-based technologies described in the IEEE 802.11 standards. In some further implementations, the network interface 770 may be a WWAN interface which communicates via the antenna 780. For example, the WWAN interface may be configured to implement 5G-based technologies. The network interface 770 also can be implemented as an IoT interface, or PLC interface, or enabled for other types of networking, such as Ethernet, token ring, optical networking, light-based communication, short-range radio frequency communication, and the like. For example, the network interface 770 may conform to specialized standards or protocols for a particular environment (such as a manufacturing-specific network, or a in-vehicle network, etc.).

In some implementations, the smart socket 650 may include more than one network interface 770 and may be capable of sending or receiving commands via more than one network communication medium. For example, the smart socket 650 may include a second network interface 775 that uses another communication technology (such as any of the communication technologies listed above with respect to the network interface 770) to communicate with the control circuit (shown at arrow 777). The second network interface 775 also may communicate (shown at arrow 779) with a control circuit of another component (not shown) in the traditional appliance 655.

In implementations that utilize the dimmer circuitry 740, the smart socket 650 also may include a dimmer voltage regulator or a pulse width modular (PWM) for managing the amount of voltage or timing used by the dimmer circuitry 740. For example, the PWM (not shown) may be used between the processor 710 and the dimmer circuitry 740 or may be included as part of the dimmer circuitry 740. Using the dimmer circuitry 740, the processor 710 can control operation of the traditional appliance 655. For example, the processor 710 can manage the dimming level (also called brightness) of light produced by a traditional light bulb. Furthermore, various types of dimmer circuitry 740 may be utilized for specialized light bulbs, such as for a light emitting diode (LED) light bulb or a compact fluorescent light (CFL) light bulb. In some implementations, the power supply relay 730 may be omitted or replaced by the dimmer circuitry 740.

In some implementations, the traditional appliance 655 is coupled to the smart socket 650 via an appliance socket 750 that is specific to a type of traditional appliance. For example, if the traditional appliance is a light bulb, the appliance socket may be a lightbulb socket. The control circuit also may be specific to the type of traditional appliance. For example, if the traditional appliance is a light bulb, the control circuit (such as the power supply relay) may be physically integrated into the light bulb holder. Other types of appliance sockets and control circuits may be used with different types of traditional appliances. In some other implementations, the traditional appliance may be an appliance with a power cable and power plug (such as a coffee machine, lamp, television, toaster, microwave, washing machine, dryer, oven, stove, power strip, or the like) designed to plug into a traditional power socket. For example, the appliance socket 750 may be a power socket into which the smart socket 650 is inserted. The smart socket 650 may be installed as a new wall power socket or may be inserted into an existing wall power socket. The control circuit 755 may be integrated with the traditional appliance. For example, the control circuit 755 may be included on a control board in a washing machine, dishwasher, oven, refrigerator, or the like. The smart socket 650 may be used to retrofit an existing traditional appliance by interfacing with a communication port of the control board. The smart socket 650 may add network-based communication to the existing control board. Furthermore, the smart socket 650 may provide translation of a command in a command protocol used by a smart appliance controller to a signal that is appropriate for the control circuit 755 in the traditional appliance 655. In some other implementations, the traditional appliance 655 may be a wearable accessory and the appliance socket 750 may correspond to a power supply line for providing power to the wearable accessory. A person having ordinary skill in the art may readily conceive of other examples of traditional appliances and related power sources which may be controlled by a smart socket.

There may be other components in the smart socket 650, not shown in FIG. 7. For example, a clock component may be utilized to supply clocking to the processor 710. Various types of memory may be utilized to store operating instructions for execution by the processor 710.

Figure 8:
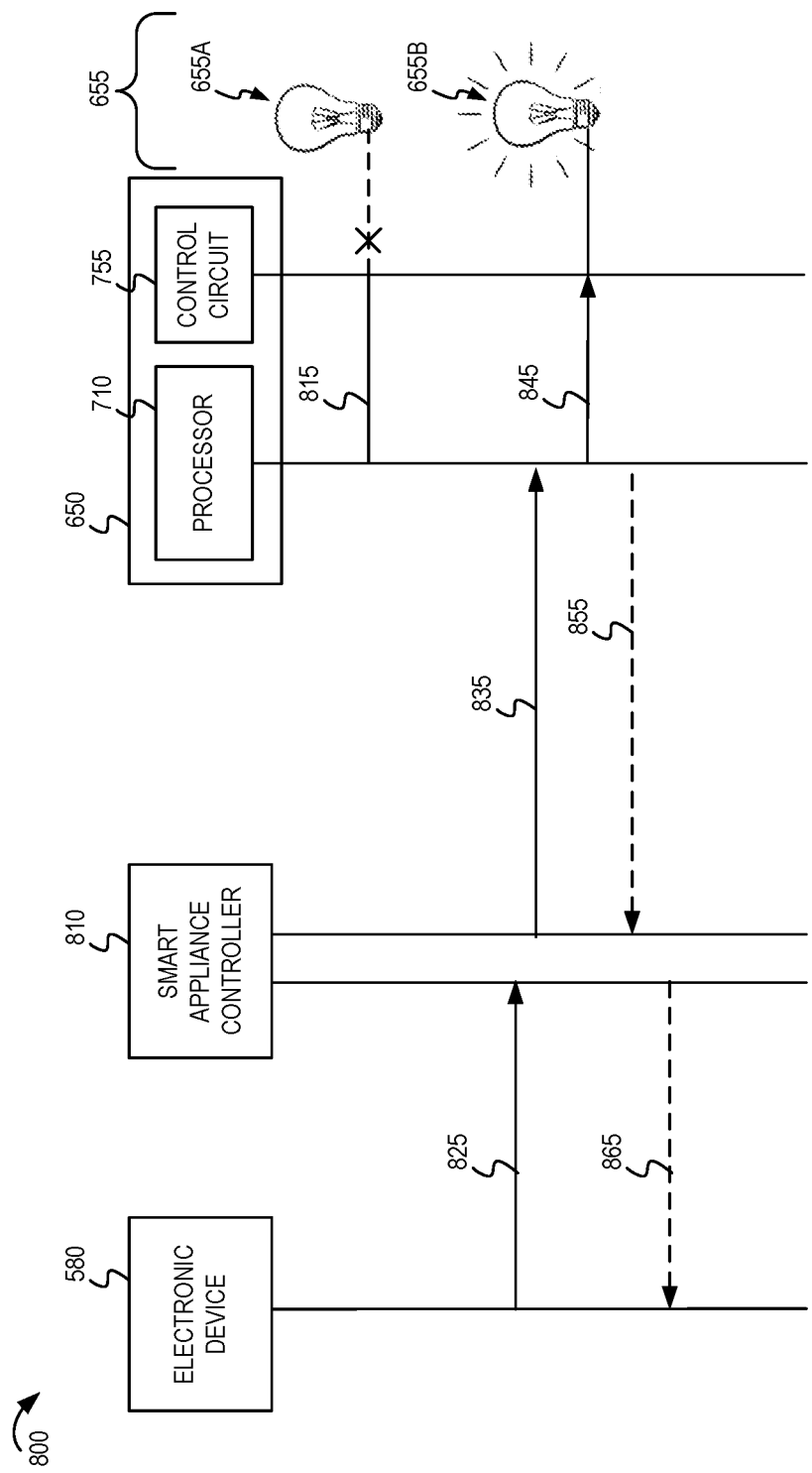
FIG. 8 shows an example message flow diagram of a traditional appliance using an smart socket.

FIG. 8 shows an example message flow diagram 800 of a traditional appliance using a smart socket. The message flow diagram 800 shows an electronic device 580, smart appliance controller 810 and an smart socket 650. The smart socket 650 includes a processor 710 and control circuit 755. In the example of FIG. 8, the control circuit 755 is located in the smart socket 650. In some other implementations, the control circuit 755 may be located in the traditional appliance 655. In some implementations, the control circuit 755 includes a power supply relay (not shown). The power supply relay is disabled in an initial state. In this initial state, the control circuit prevents power from going to the traditional appliance 655. Because the power supply relay is disabled, no power (shown at line 815) is supplied to the traditional appliance 655, and the traditional appliance 655 is turned off (shown at 655A).

At 825, the electronic device 580 sends a command associated with turning on the traditional appliance 655. The command can be sent directly to the smart socket processor 710, or through the smart appliance controller 810, and forwarded to the processor 710. The smart appliance controller 810 may be associated with multiple network interfaces and may receive or send commands over various network interfaces. The processor 710 receives the command and determines that the command includes an instruction to turn on the traditional appliance 655. In accordance with the command, the processor 710 may send a signal (at 845) to the control circuit 755 to cause the control circuit 755 to enable power. In the example of FIG. 8, the signal causes the control circuit 755 to enable power to the traditional appliance 655 and the traditional appliance 655 turns on (shown at 655B).

In some implementations, the signal (at 845) may use a different communication protocol than the command. For example, the smart socket 650 may establish a first communication link to the electronic device 580 or the smart appliance controller 810 using a first communication protocol. The command may be associated with a command protocol and may be formatted for communication using the first communication protocol. The smart socket 650 may establish a second communication link to the traditional appliance 655 that uses a second communication protocol. For example, the second communication protocol may be associated with a serial or parallel cable interface to the control circuit. The processor 710 may translate the command into a signal (at 845) that is specific to the second communication link and the control circuit. In some implementations, the smart socket 650 may download a hardware abstraction layer (or command translation instructions), or a "hosted application" on, or at, the smart socket, which is specific to the type of appliance to which the smart socket 650 is coupled. For example, the smart socket 650 may download the hardware abstraction layer (or command translation instructions) on-demand during onboarding a new type of appliance. In some implementations, the smart socket 650 may detect the type of appliance based on communication via the second communication link to the traditional appliance 655.

In some implementations, the processor 710 may send an acknowledgment message (shown at 855) to the electronic device 580 or the smart appliance controller 810. In some implementations, the smart appliance controller 810 may forward the acknowledgment message (shown at 865) to the electronic device 580.

Figure 9:
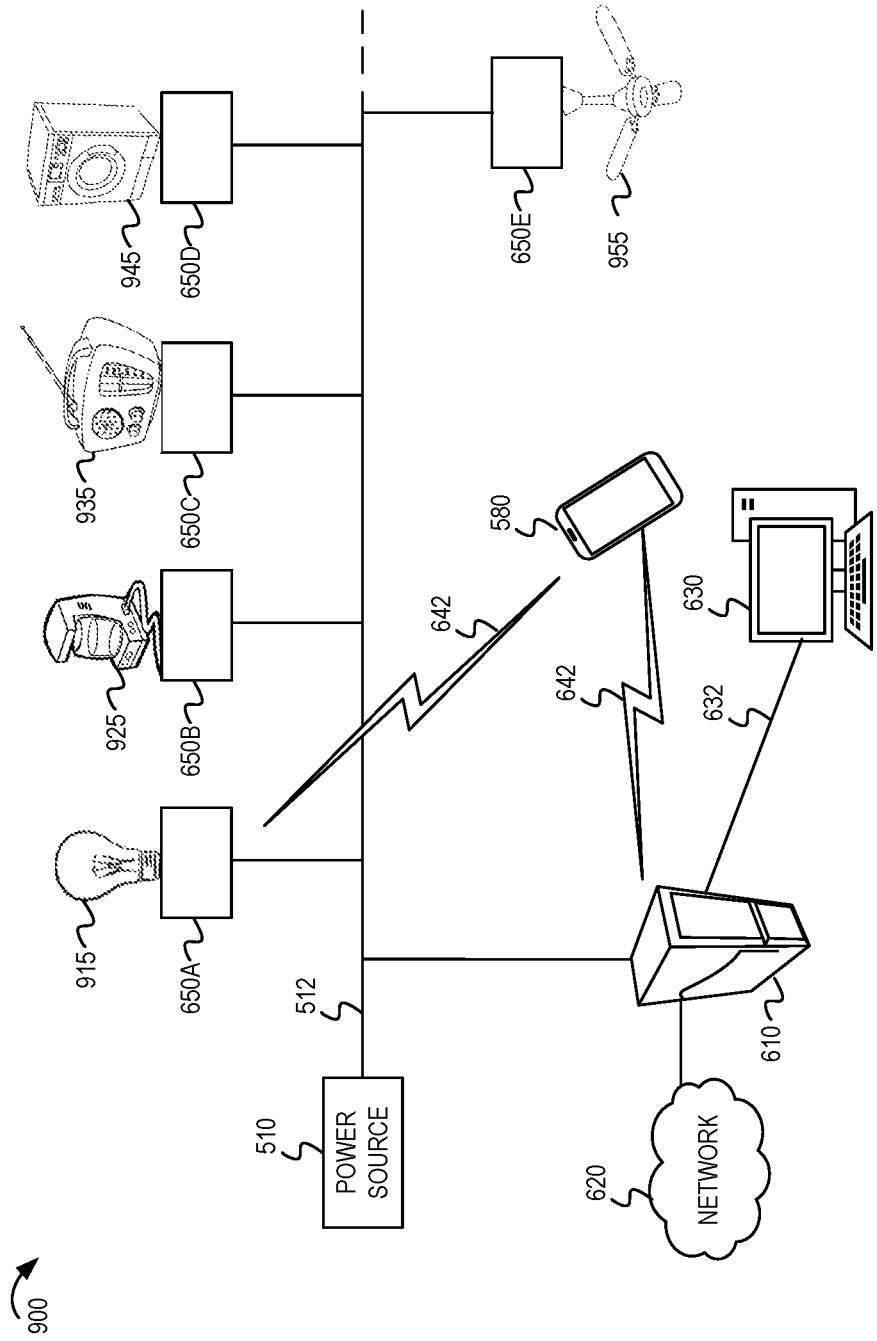
FIG. 9 shows a system diagram of example smart sockets for controlling traditional appliances.

FIG. 9 shows a system diagram 900 of example smart sockets for controlling traditional appliances. The system diagram 900 includes the power source 510, the electric power transmission line 512, the network 620, the router 610, the electronic device 580, the electronic devices 630, and the communication links 632 and 642, as previously described. In the system diagram 900, a plurality of smart sockets 650A-650E may be deployed. For example, a first smart socket 650A may control operation of a light bulb 915. A second smart socket 650B may control operation of a coffee maker 925. A third smart socket 650C may control operation of a radio 935. A fourth smart socket 650D may control operation of a washing machine 945. And, a fifth smart socket 650E may control operation of a ceiling fan 955. The smart sockets may have different types of appliance sockets. For example, the first smart socket 650A may have a light bulb socket, while smart sockets 650B, 650C, 650D may have power cable sockets for plugging in traditional appliances. The fifth smart socket 650E may be built into a power unit that couples the traditional ceiling fan 955 to the electric power transmission line 512. In the depicted example, the electronic device 580 can communicate directly with the plurality of smart sockets 650A-650E via the communication link 642.

Figure 10:
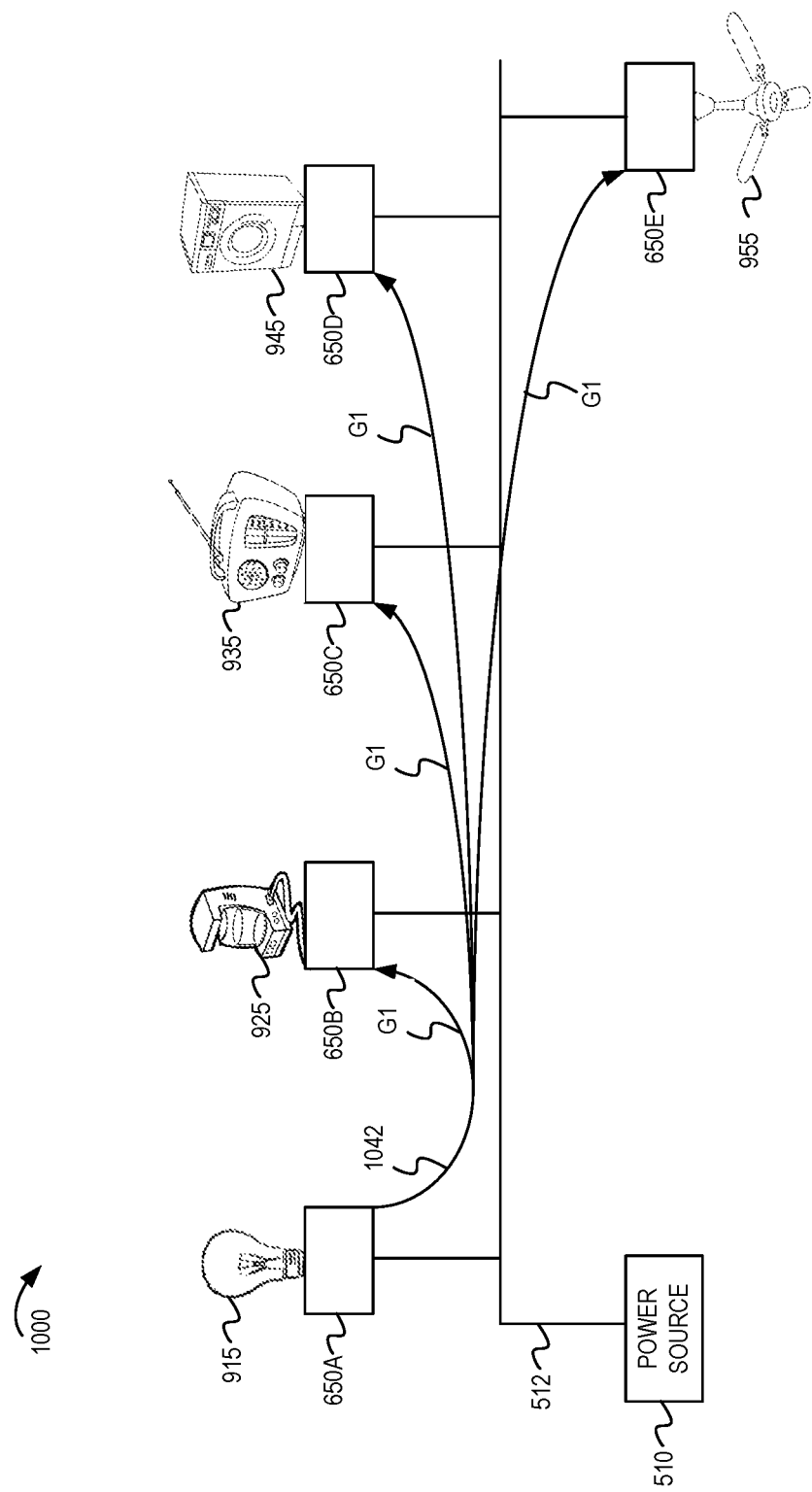
FIG. 10 shows a system diagram of an example smart socket providing power quality monitoring and coordination with a plurality of smart sockets.

FIG. 10 shows a system diagram 1000 of an example smart socket providing power quality monitoring and coordination with a plurality of smart sockets. In the system diagram 1000, the power source 510 provides power over the electric power transmission line 512 to the plurality of smart sockets 650A-650E, which in turn control the operations of the traditional appliances 915, 925, 935, 945 and 955, respectively. In FIG. 10, the first smart socket 650A is equipped with power quality monitoring functionality. In some implementations, such as in developing countries, fluctuations in power supply are common. While some power fluctuations may not have an immediate impact on the performance of the traditional appliances, over the long-term, such fluctuations can damage, or even destroy the traditional appliances. As such, by providing power quality monitoring functionality in the smart sockets, the lifespan of traditional appliances, or other electronic devices, plugged into the smart sockets can be preserved.

While possible, including power quality monitoring functionality within each smart socket can be expensive. So instead of incorporating power quality monitoring functionality in each smart socket, the power quality monitoring functionality is incorporated only into the first smart socket 650A. The first smart socket 650A can be implemented to monitor, sense, detect or receive, one or more values, or data, provided by the power source 510, or present on the electric power transmission line 512. For example, the one or more values can include current values, voltage values, power supply frequency, and power factor. Upon monitoring the data, the smart socket 650A can be implemented to process the data, and periodically provide one or more updates 1042 to one or more of the plurality of smart sockets 650B-650E. The smart socket 650A can be implemented to send updates 1042 the plurality of smart sockets 650B-650E using any suitable wireless communication technology described herein, including BLE mesh. For example, using the BLE mesh grouping and publishing functionalities, the plurality of smart sockets 650B-650E can be subscribed to a group address (G1), and the smart socket 650A can be configured to publish to all devices including a G1 designation. The smart socket 650A can periodically publish monitored or sensed values in one or more status messages which will be received by the plurality of smart sockets 650B-650E subscribed to G1.

The plurality of smart sockets 650B-650E each can include configurable threshold values for current, voltage, frequency and power factor. The configurable values can be defined, in part, by the threshold current, voltage, frequency and power factor values associated with the traditional appliance or device connected to, or plugged into the plurality of smart sockets 650B-650E. When the smart socket 650A senses fluctuations in the data related to the power source 510, or present on the electric power transmission line 512, after processing the data, it will publish, or send, the processed values to the plurality of smart sockets 650B-650E. Each of the plurality of smart sockets 650B-650E will compare the processed values to the particular threshold values, and if the processed values exceed the particular threshold values, each smart socket can be implemented to independently shut down its control circuit, or power the connected appliance or device down entirely. This way, the traditional appliances 925, 935, 945 and 955, or devices, plugged into the plurality of smart sockets 650B-650E may avoid damage due to power fluctuations.

By using the example described and depicted in FIG. 10, the more expensive first smart socket 650A, with power quality monitoring capabilities, can coordinate with the less expensive plurality of smart sockets 650B-650E, which do not have power quality monitoring capabilities, to prevent damage to connected devices due to fluctuations in power. Each of the plurality of smart sockets 650B-650E can make independent decisions, and take independent actions on whether or not to shut down its control circuitry, or power the connected device down, based on the values received from the first smart socket 650A. The independent decision criteria can be based on the type of traditional appliance or device connected to the smart sockets 650A-650E. In some implementations, the decision criteria can be configured from an electronic device (such as the electronic device 580 in FIGS. 5, 6, 8 and 9) or a smart appliance controller (such as the smart appliance controller discussed with respect to FIGS. 6-8). For example, one or more configurable values can be sent from an electronic device or smart appliance controller to one or more of the plurality of smart sockets 650A-650E.

In some implementations, such as in the event of a power outage, the plurality of smart sockets 650A-650E, and hence, the traditional appliances or devices, will operate on power derived from a backup power source like a battery or generator. The backup power source likely has a limited operating or running time, i.e., it will operate until the battery is depleted or the generator runs out of fuel. Some traditional appliances or devices, such as high wattage devices, may require, or draw, more power to operate than other devices. For example, a washing machine is generally a high wattage device that draws a significant amount of power. Additionally, some traditional appliances or devices may be deemed non-critical devices, such as a decorative lamp, whereas other devices may be deemed critical devices, such as a medical device, like a breathing apparatus. To prolong the running time on the backup power source, the plurality of smart sockets 650A-650E can be implemented to take particular actions based on the traditional appliance or device plugged into the smart socket. For example, during configuration between the plurality of smart sockets 650A-650E and the electronic device (such as the electronic device 580 in FIGS. 5, 6, 8 and 9) or the smart appliance controller (such as the smart appliance controller discussed with respect to FIGS. 6-8), each traditional appliance or device can be assigned an electrical load categorization, or category. The electrical load categorization, or category, can be based on one or more of the following: criticality of the device (i.e., critical versus non-critical), impact on user experience, availability of low power modes, availability of alternative devices, and operating wattage of the device.

For example, the categories may be defined according to Table 1:

TABLE 1

Device Categorization

| Category | Device Type | Action on Backup Power Mode | Action on Power Restoration |
|---|---|---|---|
| 1 | Non-Critical/High-Wattage | Turn Off | Turn On |
| 2 | Low Power Mode | Enter Low Power Mode | Exit Low Power Mode |
| 3 | Power Alternatives | Low Power Device Turns On, while High Power Device Turns Off | Low Power Device Turns Off, while High Power Device Turns On |
| 4 | Critical | No Action (Remain On) | No Action (Remain On) |

Upon detecting that power is being derived from a backup power source, the smart socket 650A can be implemented to publish one or more status messages indicating that power is being derived from a backup power source to the plurality of smart sockets 650B-650E subscribed to G1. Similarly, upon detecting that the main power supply is restored, the smart socket 650A can be implemented to publish one or more status messages indicating that power is restored to the plurality of smart sockets 650B-650E subscribed to G1.

Upon receiving the one or more backup power source status messages from the smart socket 650A, a smart socket operating a first electrical load categorization, or category 1, device, such as a washing machine, which is not a critical appliance, and additionally draws high wattage, can be implemented to shut down its own control circuit, or turn the connected device off. Upon receiving the one or more power restored status messages from the smart socket 650A, the smart socket can be implemented to turn on its own control circuit, or turn the connected device on. Other examples of category 1 non-critical or high-wattage devices include decorative, or aesthetic-purposed, lamps, televisions, computer monitors, printers, electric ovens, ironing machines, water pressure boosters, etc.

Upon receiving the one or more backup power source status messages from the smart socket 650A, a smart socket operating a second electrical load categorization, or category 2 device, such as an air purifier with a lower power mode, can be implemented to send commands to the air purifier to move from normal operating mode to the lower power mode. Upon receiving the one or more power restored status messages from the smart socket 650A, the smart socket can be implemented to send commands to the air purifier to exit lower power mode and return to normal operating mode. Other examples of category 2 low power mode functionality devices include light emitting diode (LED) lamps with high brightness and low brightness settings, air conditioners with power control features, etc.

Upon receiving the one or more backup power source status messages from the smart socket 650A, a smart socket operating one or more third electrical load categorization, or category 3 devices, i.e., power alternative devices, such as an air conditioner (high power device) and a fan (low power device), can be implemented to turn the air conditioner off and to turn the fan on. Upon receiving the one or more power restored status messages from the smart socket 650A, the smart socket can be implemented to turn off the fan and to turn on the air conditioner. Other examples of category 3 alternative power devices include using energy efficient LED lights instead of high wattage incandescent light bulbs, etc.

Upon receiving the one or more backup power source status messages from the smart socket 650A, a smart socket operating a fourth electrical load categorization, or category 4 device, such as a critical medical device, can be implemented to enter an active mode, and if already in the active mode, take no further action, or in other words, keep the connected device powered on. Upon receiving the one or more power restored status messages from the smart socket 650A, the smart socket can again be implemented to enter the active mode, and if already in the active mode, take no further action, or in other words, keep the connected device powered on. Other examples of category 4 critical devices include home security systems, smoke detectors, fire alarms, etc.

Because each of the plurality of smart sockets 650B-650E acts based on the one or more status messages published by the smart socket 650A, there is no need for a central device to keep track of the individual states of all the smart sockets and connected devices. This partially decentralized system makes implementation in a smart home environment relatively simple, as each of the plurality of smart sockets 650A-650E themselves have sufficient information to coordinate and handle appropriate actions. A person having ordinary skill in the art will readily recognize that Table 1 merely provides an example, and that fewer or additional categories, as well as different criteria and appropriate actions, are well within the scope of this disclosure.

In some implementations, such as in communities, cities, or states with electricity tariffs, i.e., where the price of electricity differs depending on the time of day, day of the week, etc., one or more of the plurality of smart sockets 650A-650E can be implemented to defer appliance usage until the electricity tariff is low. Similarly, one or more of the plurality of smart sockets 650A-650E can be implemented to defer appliance usage until the electricity is derived from a renewable energy source, such as solar power, or wind power. Substantial financial savings can be achieved by deferring usage of non-time critical appliances, such as washing machines, or dishwashers, to periods where the electricity tariff is low, or when power is derived from a renewable energy source.

To obtain financial savings by deferring usage of non-time critical appliance until the electricity tariff is low, or when power is derived from a renewable energy source, each appliance or device can be assigned to a time category. The time category can be divided between non-time critical (i.e., the device can be operated at any time) and time critical (i.e., the device is required to operate now). The appliance or devices can be assigned a time category during the configuration between the plurality of smart sockets 650A-650E and the electronic device (such as the electronic device 580 in FIGS. 5, 6, 8 and 9), the smart appliance controller (such as the smart appliance controller discussed with respect to FIGS. 6-8), or a router (such as the router 610 in FIGS. 6 and 9). Also, during the configuration session, the electrical tariff timetable for the community, city or state, or renewable energy source timetable, can be accessed by, or programmed into, the electronic device, the smart appliance controller, or the router, so these devices can later publish the timetables to the plurality of smart sockets 650A-650E. The plurality of smart sockets 650A-650E can be implemented to defer the operation or usage of appliances or devices designated as non-time critical devices until the electricity tariff is low, until power is derived from a renewable energy source, or when a particular defer deadline is reached.

For example, in FIGS. 9 and 10, the smart socket 650D can be implemented to defer the operation of the washing machine 945, a non-time critical device, until a period of low electricity tariffs (such as before 9 am, or after 7 pm), until a renewable energy source kicks in (such as when solar powered panels provide supplemental power), or until a particular point in time for which the operation can be deferred (such as a configurable maximum defer deadline). Once the low electricity tariff period is reached, renewable energy source provides supplemental power, or the deferral deadline is exceeded, the smart socket 650D can be implemented to send a command to the washing machine 945 to commence operation. As a corollary, appliances or devices that are connected to one or more of the plurality of smart sockets 650A-650E and categorized as time critical devices can be implemented to operate as expected, or according to a particular programmed schedule.

The plurality of smart sockets 650A-650E can be implemented to provide timer-based functionality so that the connected appliances and devices can be turned on or off according to a schedule. In some implementations, the plurality of smart sockets 650A-650E can be configured to turn on an appliance or device after a certain other dependent task has been completed, or reached a certain state. For example, a smart socket connected to an extractor, or electric chimney, located within a kitchen could be implemented to turn the extractor on at 1, 2, 5 or 10 minutes, etc., after the oven or stove has been turned on. As such, the plurality of smart sockets 650A-650E can be configured with at least the following attributes, or configurable values: start time (time at which the operation of the appliance or device shall start), duration (duration for which the operation of the appliance or device shall continue), timed events triggers (events, which upon occurrence, or upon expiration, will trigger some action), and end time (time at which the operation of the appliance or device shall cease).

Referring back to the extractor in the kitchen example, where one smart socket is connected to an electric induction stove, and another smart socket is connected to an extractor, and the smart sockets are communicating wirelessly with one another. The smart socket connected to the electric induction stove can be configured to start operation of the electric induction stove at 7 pm, for a duration of 30 minutes. The smart socket connected to the extractor can be configured to start operation of the extractor at 7:10 pm, i.e., a timed event 10 minutes after the electric induction stove commenced operation. The smart socket connected to the extractor can be configured to increase the extractor power at 7:20 pm, i.e., a timed event 20 minutes after the electric induction stove commenced operation. The smart socket connected to the electric induction stove can be configured to cease operation of the electric induction stove at 7:30 pm, and the smart socket connected to the extractor can be configured to cease operation of the extractor at 7:30 pm, i.e., either a timed event 20 minutes after its own initial operation, or triggered based on the expiration of the electric induction stove's operation. These configurable values can be input upon initial configuration between one or more of the plurality of smart sockets 650A-650E, or dynamically input anytime during the operation of the plurality of smart sockets 650A-650E.

With this approach, energy efficiency can be improved, as the smart sockets enable the appliances or devices to spring into operation at the precise time they are needed. Additionally, using this approach, the smart socket timer functionality is not simply a standalone feature, but instead uses the context of operation of other smart sockets, and hence their respective appliances and devices, before taking an appropriate action, which also improves energy efficiency and promotes user experience.

In some implementations, and to further improve energy efficiency, the plurality of smart sockets 650A-650E can be configured to communicate with an electric smart meter. The electric smart meter can be implemented to receive the total electricity consumed by the appliances and devices plugged into the plurality of smart sockets 650A-650E. The smart meter can be configured, or have configurable values associated with a threshold total electricity consumption target for the day, the week, the month, etc., and can periodically inform the plurality of smart sockets 650A-650E as to the percentage of the threshold total electricity consumption their respective appliances and devices are consuming. In some implementations, the smart meter can use BLE mesh to publish one or more messages related to the electricity consumption to the plurality of smart sockets 650A-650E. In response, the plurality of smart sockets 650A-650E can be implemented to take corrective action via one or more of the approaches described herein, such as changing the operation of the appliance or device to low power mode, or using alternative low power appliances or devices, or operating the appliances or devices in low electricity tariff periods, or operating the appliances or devices when running on renewable energy sources, or scheduling the autonomous operation of the appliances or devices based on the context of operation within the smart home environment, etc. Such approaches can promote energy efficiency, and achieve configurable energy targets.

Figure 11:
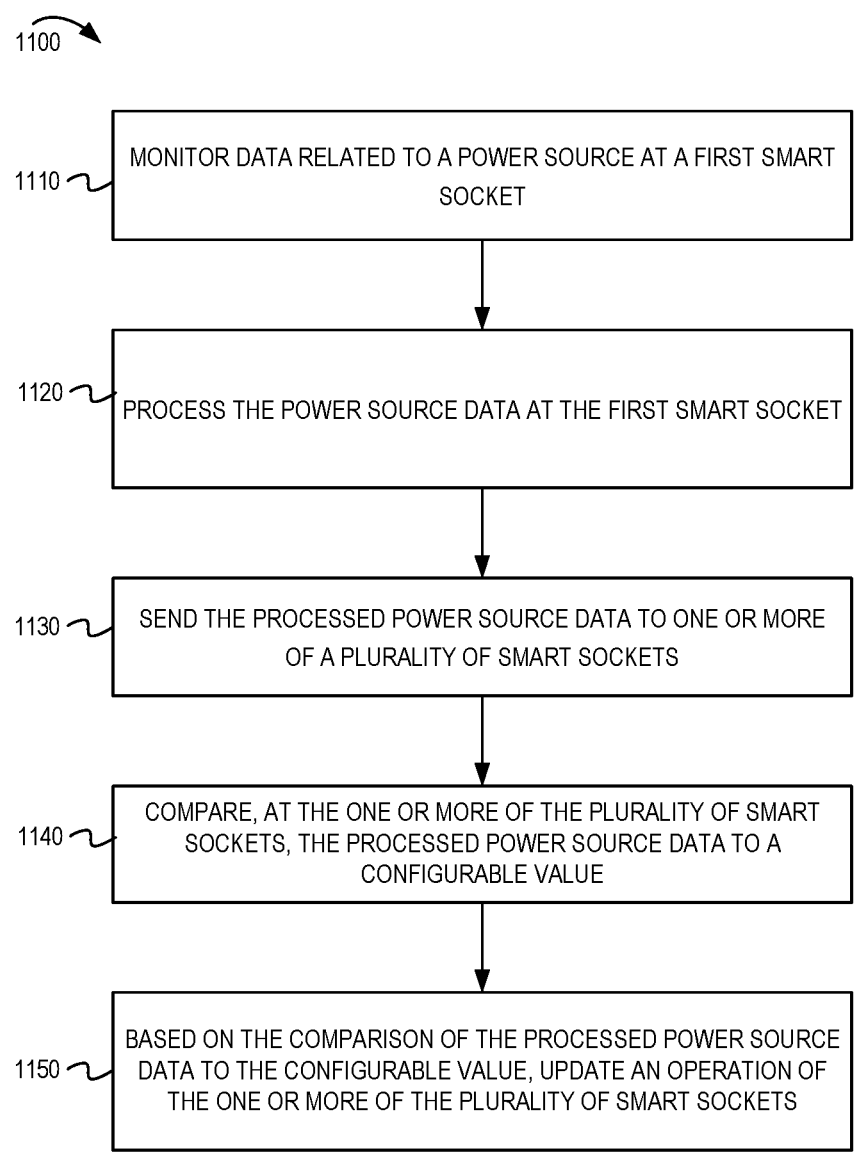
FIG. 11 shows an example method for communication amongst a plurality of smart sockets.

FIG. 11 shows an example method 1100 for communication amongst a plurality of smart sockets. The operations of the method 1100 may be implemented by the smart socket 650, depicted and described in FIGS. 6-8, or its components described throughout. The operations of the method 1100 also may be implemented by one or more of the plurality of smart sockets 650A-650E, depicted and described in FIGS. 9 and 10, or their components as described throughout.

In some implementations, the described smart socket 650 or the plurality of smart sockets 650A-650E, may execute a set of codes to control the functional elements of the respective device, or of one or more other devices, to perform the functions described in FIG. 11 Additionally, or alternatively, the described smart socket 650 or the plurality of smart sockets 650A-650E, may perform aspects of the functions described in FIG. 11 using special-purpose hardware.

At block 1110, data related to a power source can be monitored at a first smart socket. The power source can provide power over electrical wiring, such as via an electric power transmission line, or wirelessly, such as via wireless power, to one or more devices. The power source can be a main power source (such as a main power supply), a backup power source (such as a battery or generator), a renewable energy source (such as wind, solar, thermal, etc.), or the like. The data can include values related to the power source. For example, the data can include current values, voltages values, frequency values, power factor values, etc., related to the operation of the power source. The first smart socket can monitor the data related to the power source by sensing, detecting or receiving the data provided by the power source, or sent over the electric power transmission line, or via wireless communication with the power source.

At block 1120, the power source data can be processed by the first smart socket. In some implementations, the first smart socket can process the power source data itself, via an embedded processor. In some other implementations, the first smart socket can send the power source data to a remote processor, such as a device operating in the cloud, to process the power source data.

At block 1130, the processed power source data can be sent to one or more of a plurality of smart sockets. The first smart socket can send the processed power source data to one or more of the plurality of smart sockets. In some implementations, the processed power source data can be sent over a BLE mesh network. In some other implementations, the processed power source data can be sent over a low power IoT network, a 5G network, a WLAN network, or another PAN network.

At block 1140, the processed power source data can be compared to a configurable value. One or more of the plurality of smart sockets can compare the processed power source data to a configurable value. The configurable value can be programmed, set or determined during onboarding of the particular smart socket, or the connected appliance or device, to the network. In some implementations, the configurable value may be dynamically determined based on the context of operation. In some implementations, the configurable value may be provided by an appliance or device connected to, or plugged into, the smart socket. The configurable value can include a power threshold value (such as a high power threshold value, or a low power threshold value; or a maximum power threshold value, or a minimum power threshold value), an electrical load categorization, or category, (such as a first category, indicating non-critical or high-wattages appliances or devices; a second category, indicating appliances or devices having low power modes; a third category, indicating appliances or devices having power alternatives; and a fourth category, indicating critical or essential appliance or devices), a time category (such as non-time critical, or time critical; or a period of high electricity tariff, or a period of low electricity tariff), timer-related attributes (such as start time, duration, timed event triggers or end time), or energy targets (such as a maximum or minimum power consumption threshold per day, per week, per month, etc.)

The term "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

At block 1150, based on the comparison of the processed power source data to the configurable value, one or more of the plurality of smart sockets can be updated. The updating can include updating an operation of one or more of the plurality of smart sockets. Depending on the comparison, and the configurable value, one or more of the plurality of smart sockets can be implemented to update the operation of itself, or update the operation of the connected appliance or device. For example, the updating the operation can include: turn on, turn off (or power down), operate in a lower power mode, operate in a low power alternative mode, operate in an active mode, defer operation until a particular time, defer operation until a particular event, or defer operation until a particular trigger.

While the example method 1100 in FIG. 11 includes five discrete blocks, a person having ordinary skill in the art will readily recognize that other blocks can be inserted between the depicted blocks. Additionally, other blocks may be performed before or after certain depicted blocks.

Figure 12:
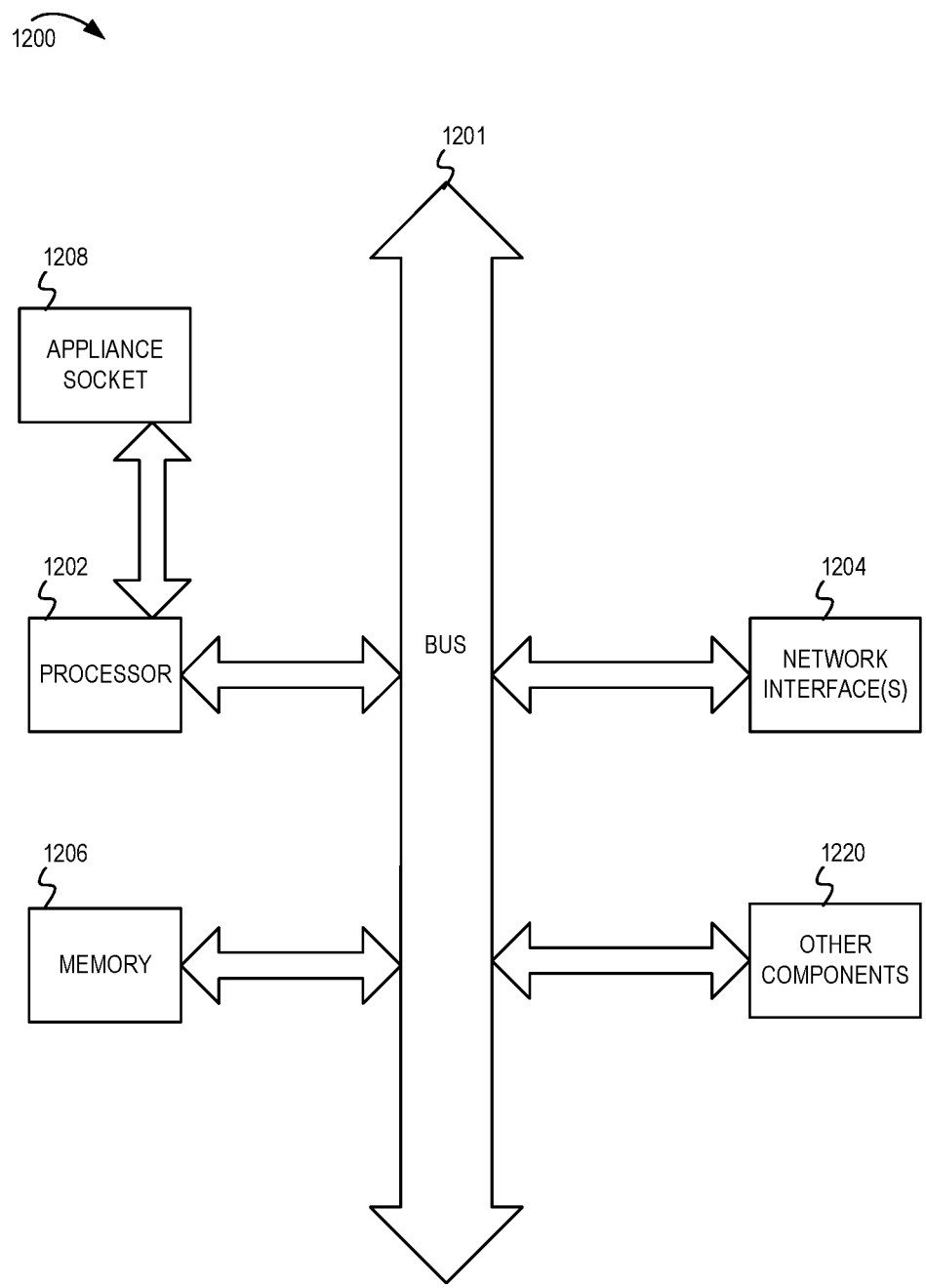
FIG. 12 shows a block diagram of an example electronic device for implementing aspects of this disclosure.

FIG. 12 shows a block diagram of an example electronic device 1200 for implementing aspects of this disclosure. In some implementations, the electronic device 1200 may be an smart socket (such as smart socket 650) or a smart appliance controller (such as router 610). The electronic device 1200 includes an appliance socket 1208 for coupling to a traditional appliance. The appliance socket 1208 may be a light bulb holder, power plug, power cable socket, or the like. The electronic device 1200 includes a processor 1202 (possibly including multiple processors, multiple cores, multiple nodes, or implementing multi-threading, etc.). The processor 1202 may be a component of a processing system.

A processing system may generally refer to a system or series of machines or components that receives inputs and processes the inputs to produce a set of outputs (which may be passed to other systems or components of, for example, the electronic device 1200). For example, a processing system of the electronic device 1200 may refer to a system including the various other components 1220 or subcomponents of the electronic device 1200. The processing system may receive, process, and output information (such as information related to ranging protocol improvements for antenna switching).

The processing system of the electronic device 1200 may interface with other components of the electronic device 1200, and may process information received from other components (such as inputs or signals), output information to other components, etc. For example, a chip or modem of the electronic device 1200 may include a processing system, a first interface to output information, and a second interface to receive information. In some cases, the first interface may refer to an interface between the processing system of the chip or modem and a transmitter, such that the electronic device 1200 may transmit information output from the chip or modem. In some cases, the second interface may refer to an interface between the processing system of the chip or modem and a receiver, such that the electronic device 1205 may receive information or signal inputs, and the information may be passed to the processing system.

The electronic device 1200 includes a memory 1206. The memory 1206 may be system memory or any one or more of the below described possible realizations of machine-readable media. The electronic device 1200 also may include a bus 1201 (such as PCI, ISA, PCI-Express, Hyper-Transport®, InfiniBand®, NuBus, AHB, AXI, etc.). The electronic device may include one or more network interfaces 1204, which may be a wireless network interface (such as a WLAN interface, a Bluetooth® interface, a WiMAX interface, a ZigBee® interface, a Wireless USB interface, or another network interface associated with the wireless networking technologies described herein) or a wired network interface (such as a powerline communication interface, an Ethernet interface, etc.). In some implementations, electronic device 1200 may support multiple network interfaces 1204, each of which may be configured to couple the electronic device 1200 to a different communication network.

The memory 1206 includes functionality to support various implementations described above. The memory 1206 may include one or more functionalities that facilitate a smart socket for networking a traditional appliance. For example, the memory 1206 can implement one or more aspects of a smart socket 650 as described above. The memory 1206 can enable implementations described in FIGS. 1-11 above. The electronic device 1200 also may include other components 1220, such as a clock source, isolator circuitry, dimmer circuitry, or the like. In some implementations, the other components 1220 may include a control circuit for controlling a traditional appliance.

Any one of these functionalities may be partially (or entirely) implemented in hardware, such as on the processor 1202. For example, the functionality may be implemented with an application specific integrated circuit, in logic implemented in the processor 1202, in a co-processor on a peripheral device or card, etc. Further, realizations may include fewer or additional components not illustrated in FIG. 12 (such as video cards, audio cards, additional network interfaces, peripheral devices, etc.). The processor 1202, and the memory 1206, may be coupled to the bus 1201. Although illustrated as being coupled to the bus 1201, the memory 1206 may be directly coupled to the processor 1202.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends on the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray™ disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine-readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of wireless communication amongst a first smart socket and at least a second smart socket, wherein the first smart socket and the second smart socket are respectively plugged into an electrical power outlet or receptacle and include a network interface to provide traditional appliances with smart control features, comprising:
    monitoring, at the first smart socket equipped with power quality monitoring functionality, data related to a power source;
    processing, at the first smart socket, the power source data;
    sending, from the first smart socket, the processed power source data to the second smart socket via a Bluetooth Low Energy (BLE) mesh network, wherein the second smart socket lacks power quality monitoring capabilities;
    comparing, at the second smart socket, the processed power source data to a configurable value; and
    based on the comparison of the processed power source data to the configurable value, updating an operation of the second smart socket.

2. The method of claim 1, wherein the configurable value includes a power threshold value.

3. The method of claim 2, wherein when the power source data exceeds the power threshold value, the updating the operation includes powering down the second smart socket.

4. The method of claim 1, wherein processing the power source data includes determining if the power source is a backup power source.

5. The method of claim 4, wherein the configurable value includes an electrical load categorization.

6. The method of claim 5, wherein when:
    the electrical load categorization is a first category, the updating the operation includes powering down the second smart socket;
    the electrical load categorization is a second category, the updating the operation includes operating the second smart socket in a lower power mode;
    the electrical load categorization is a third category, the updating the operation includes operating the second smart socket in a low power alternative mode; and
    the electrical load categorization is a fourth category, the updating the operation includes operating the second smart socket in an active mode.

7. The method of claim 1, wherein the power source data indicates a period of high electricity tariff.

8. The method of claim 7, wherein the configurable value includes a time category.

9. The method of claim 8, wherein when:
    the time category is non-time critical, the updating the operation includes deferring operation of the second smart socket until the period of high electricity tariff expires; and
    the time category is time critical, the updating the operation includes operating the second smart socket in an active mode.

10. The method of claim 9, wherein processing the power source data includes determining if the power source is a renewable energy power source.

11. The method of claim 10, wherein when the time category is non-time critical, the updating the operation includes operating the second smart socket in the active mode via the renewable energy power source.

12. A first smart socket equipped with power quality monitoring functionality, in wireless communication with at least a second smart socket, wherein the first smart socket and the second smart socket are respectively plugged into an electrical power outlet or receptacle and include a network interface to provide traditional appliances with smart control features, comprising:
    a network interface;
    a processor;
    memory in electronic communication with the processor; and
    instructions stored in the memory and operable, when executed by the processor, to cause the first smart socket to:
        monitor data related to a power source;
        process the power source data;

send, via the network interface over a Bluetooth Low Energy (BLE) mesh network, the processed power source data to the second smart socket, wherein the second smart socket lacks power quality monitoring capabilities;

wherein the second smart socket compares the processed power source data to a configurable value, and based on the comparison of the processed power source data to the configurable value, the second smart socket updates an operation.

13. The first smart socket of claim 12, wherein the configurable value includes a power threshold value.

14. The first smart socket of claim 13, wherein when the power source data exceeds the power threshold value, the updating the operation includes powering down the second smart socket.

15. The first smart socket of claim 12, wherein processing the power source data includes determining if the power source is a backup power source.

16. The first smart socket of claim 15, wherein the configurable value includes an electrical load categorization.

17. The first smart socket of claim 16, wherein when:
the electrical load categorization is a first category, the updating the operation includes powering down the second smart socket;
the electrical load categorization is a second category, the updating the operation includes operating the second smart socket in a lower power mode;
the electrical load categorization is a third category, the updating the operation includes operating the second smart socket in a low power alternative mode; and
the electrical load categorization is a fourth category, the updating the operation includes operating the second smart socket in an active mode.

18. The first smart socket of claim 12, wherein the power source data indicates a period of high electricity tariff.

19. The first smart socket of claim 18, wherein the configurable value includes a time category.

20. The first smart socket of claim 19, wherein when:
the time category is non-time critical, the updating the operation includes deferring operation of the second smart socket until the period of high electricity tariff expires; and
the time category is time critical, the updating the operation includes operating the second smart socket in an active mode.

21. The first smart socket of claim 20, wherein:
the processing the power source data includes determining if the power source is a renewable energy power source; and
when the time category is non-time critical, the updating the operation includes operating the second smart socket in the active mode via the renewable energy power source.

22. A non-transitory computer-readable medium comprising processor-executable program code configured to cause a processor of a first smart socket, in wireless communication with a second smart socket, wherein the first smart socket and the second smart socket are respectively plugged into an electrical power outlet or receptacle and include a network interface to provide traditional appliances with smart control features, to:
monitor data related to a power source, wherein the first smart socket is configured with power quality monitoring functionality;
process the power source data;
send the processed power source data to the second smart socket via a Bluetooth Low Energy (BLE) mesh network, wherein the second smart socket lacks power quality monitoring capabilities; and
wherein the second smart socket compares the processed power source data to a configurable value, and based on the comparison of the processed power source data to the configurable value, the second smart socket updates an operation.

23. The non-transitory computer-readable medium of claim 22, wherein the configurable value includes a power threshold value.

24. The non-transitory computer-readable medium of claim 23, wherein when the power source data exceeds the power threshold value, the updating the operation includes powering down the second smart socket.

25. The non-transitory computer-readable medium of claim 22, wherein processing the power source data includes determining if the power source is a backup power source.

26. The non-transitory computer-readable medium of claim 25, wherein the configurable value includes an electrical load categorization.

27. The non-transitory computer-readable medium of claim 26, wherein when:
the electrical load categorization is a first category, the updating the operation includes powering down the second smart socket;
the electrical load categorization is a second category, the updating the operation includes operating the second smart socket in a lower power mode;
the electrical load categorization is a third category, the updating the operation includes operating the second smart socket in a low power alternative mode; and
the electrical load categorization is a fourth category, the updating the operation includes operating the second smart socket in an active mode.

28. The non-transitory computer-readable medium of claim 22, wherein the power source data indicates a period of high electricity tariff.

29. The non-transitory computer-readable medium of claim 28, wherein the configurable value includes a time category.

30. The non-transitory computer-readable medium of claim 29, wherein when:
the time category is non-time critical, the updating the operation includes deferring operation of the second smart socket until the period of high electricity tariff expires; and
the time category is time critical, the updating the operation includes operating the second smart socket in an active mode.

* * * * *